(12) United States Patent
Marzban et al.

(10) Patent No.: US 12,375,940 B2
(45) Date of Patent: Jul. 29, 2025

(54) USER EQUIPMENT TRUST RE-EVALUATION

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Gauravkumar Shah, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 18/057,154

(22) Filed: Nov. 18, 2022

(65) Prior Publication Data

US 2024/0171992 A1 May 23, 2024

(51) Int. Cl.
*H04W 16/00* (2009.01)
*H04L 41/16* (2022.01)
*H04W 16/22* (2009.01)
*H04W 24/02* (2009.01)

(52) U.S. Cl.
CPC ............ *H04W 16/22* (2013.01); *H04L 41/16* (2013.01); *H04W 24/02* (2013.01)

(58) Field of Classification Search
CPC ........ H04W 16/22; H04W 24/02; H04L 41/16
See application file for complete search history.

(56) References Cited

U.S. PATENT DOCUMENTS

| | | | |
|---|---|---|---|
| 2023/0247416 A1* | 8/2023 | Zhang | H04W 24/02 |
| 2024/0381152 A1* | 11/2024 | Song | H04W 24/02 |

OTHER PUBLICATIONS

Baracaldo N., et al., "Detecting Poisoning Attacks on Machine Learning in IoT Environments", 2018 IEEE International Congress on Internet of Things (ICIOT), Jul. 2-7, 2018, pp. 57-64.
Hong S., et al., "On the Effectiveness of Mitigating Data Poisoning Attacks with Gradient Shaping", CoRR, arXiv:2002.11497v2 [cs.CR], Feb. 27, 2020, pp. 1-18.
Nelson B., et al., "Exploiting Machine Learning to Subvert Your Spam Filter", LEET'08: In Proceedings of First USENIX Workshop on Large Scale Exploits and Emergent Threats, Apr. 2008, 9 Pages.
Steinhardt J., et al., "Certified Defenses for Data Poisoning Attacks", 31st Conference on Neural Information Processing Systems (NIPS 2017), arXiv:1706.03691v2 [cs.LG], Nov. 24, 2017, pp. 1-15.
Zhao Y., et al., "PDGAN: A Novel Poisoning Defense Method in Federated Learning Using Generative Adversarial Network", International Conference on Algorithms and Architectures for Parallel Processing, ICA3PP 2019, Jan. 22, 2020, pp. 595-609.

(Continued)

*Primary Examiner* — Erika A Washington
(74) *Attorney, Agent, or Firm* — Patterson+ Sheridan, L.L.P.

(57) ABSTRACT

Certain aspects of the present disclosure provide a method for wireless communications at a first network entity, comprising: outputting, to a second network entity, a request for an evaluation of suitability of at least one user equipment (UE) for data collection for at least one of machine learning (ML) model training or scenario evaluation; and obtaining, in response to the request, results of the evaluation.

30 Claims, 16 Drawing Sheets

(56) References Cited

OTHER PUBLICATIONS

Ericsson: "New Key issue on the robustness of the RAN AI/ML framework against data poisoning attacks", S3-223068, 3rd Generation Partnership Project, Mobile Competence Centre, 650, Route Des Lucioles, F-06921, Sophia-Antipolis Cedex, France, vol. SA WG3, No. e-meeting, Oct. 10, 2022-Oct. 14, 2022, Oct. 16, 2022, XP052271982, 2 Pages, 3 Rationale, 5.X.1 Key issue details, 5.X.2 Security threats, 5.X.3 Potential security requirements.

Ericsson: "pCR TR 28.908 Add use case on AI-ML Security", S5-225496, 3rd Generation Partnership Project, Mobile Competence Centre, 650, Route Des Lucioles, F-06921, Sophia-Antipolis Cedex, France, vol. SA WG5, No. e-meeting, Aug. 15, 2022-Aug. 24, 2022, Aug. 5, 2022, XP052258831, 3 Pages, 5.X.1 Description, 5.X.2.2 Monitor/validate (training and interference input data).

International Search Report and Written Opinion—PCT/US2023/077012—ISA/EPO—Jan. 24, 2024.

Nokia: "pCR TR28.908 Add use case on AIML data trustworthiness", S5-226040, 3rd Generation Partnership Project, Mobile Competence Centre, 650, Route Des Lucioles, F-06921, Sophia-Antipolis Cedex, France, vol. 3GPP SA 5, No. Toulouse, FR, Nov. 14, 2022-Nov. 18, 2022, Nov. 3, 2022, XP052220771, 3 Pages, 3 Rationale 5.A.2.2 AI/ML data trustworthiness, 5.A.3 Potential requirements, 5.A.4 Possible solutions.

\* cited by examiner

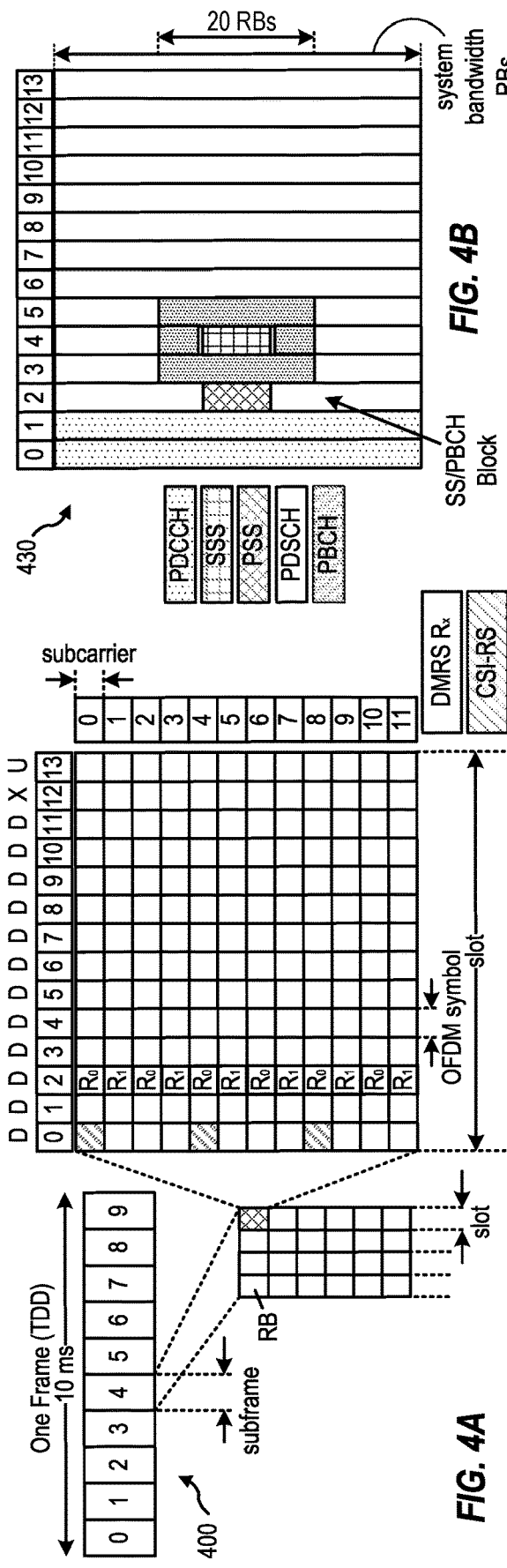
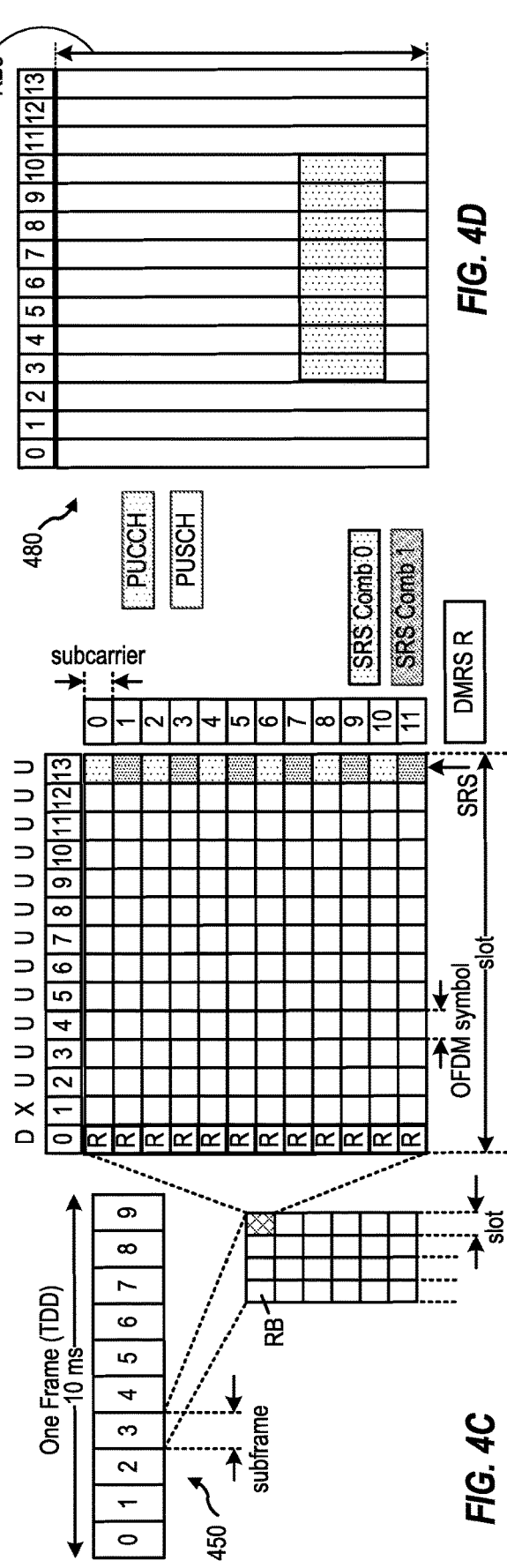

USER EQUIPMENT TRUST RE-EVALUATION

BACKGROUND

Field of the Disclosure

Aspects of the present disclosure relate to wireless communications, and more particularly, to techniques for trust reevaluation for devices involved in data collection for model training.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a first network entity. The method includes outputting, to a second network entity, a request for an evaluation of suitability of at least one user equipment (UE) for data collection for at least one of machine learning (ML) model training or scenario evaluation; and obtaining, in response to the request, results of the evaluation.

Another aspect provides a method for wireless communications at a UE. The method includes outputting, to a network entity, a request for an evaluation of suitability of the UE for data collection for at least one of ML model training or scenario evaluation; and obtaining, in response to the request, results of the evaluation.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIGS. 6 and 7 depict example call flow diagrams for model training in a wireless network.

DETAILED DESCRIPTION

Figure 1:
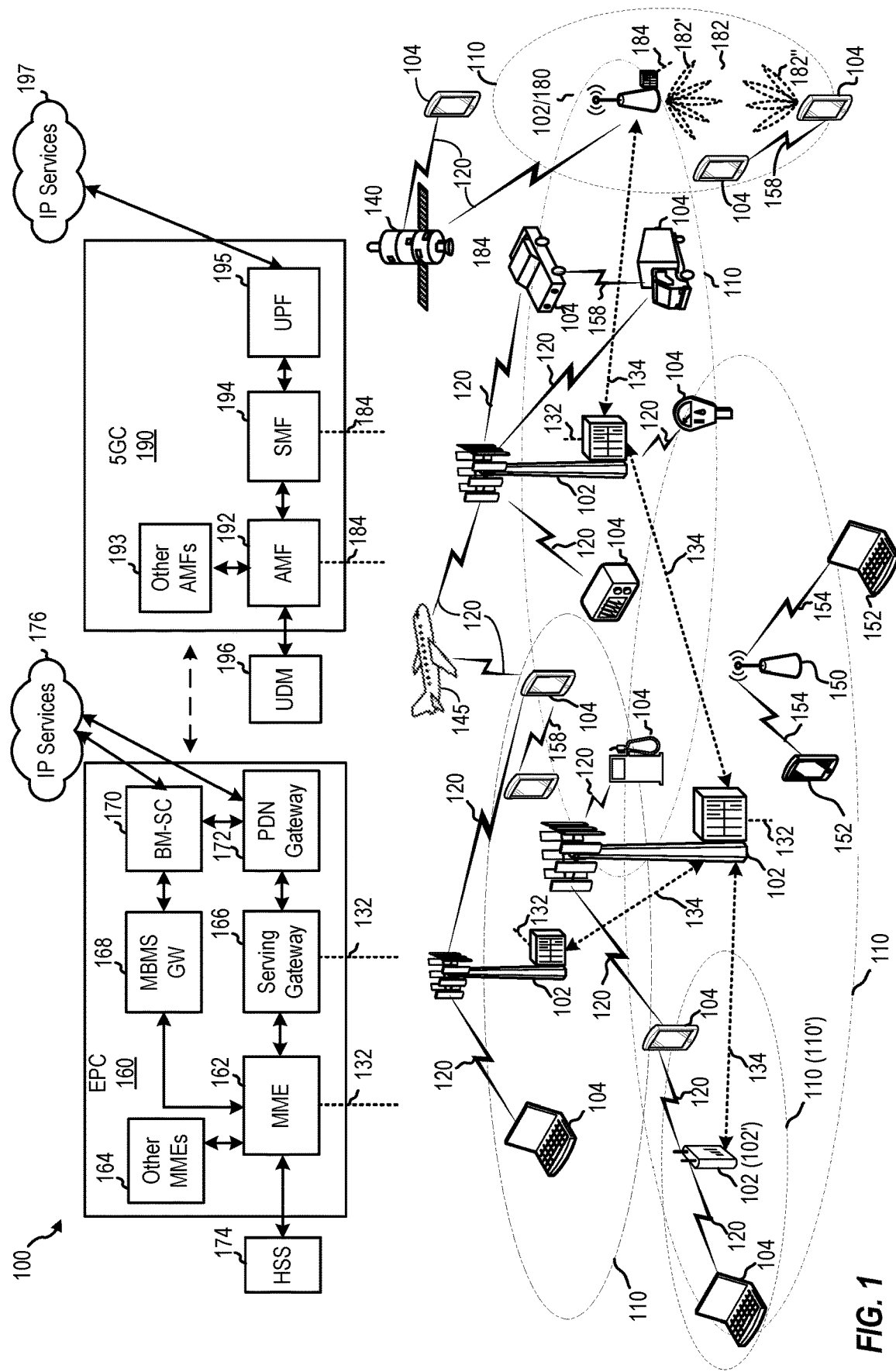
FIG. 1 depicts an example wireless communications network.

Aspects of the present disclosure provide apparatuses, methods, processing systems, and computer-readable mediums for trust reevaluation for devices involved in data collection for model training.

There are a variety of different use cases for Artificial intelligence (AI) and machine learning (ML) based models (hereinafter, simply ML-based models or ML models) in wireless networks. Such use cases for ML models include network energy savings, for example, where certain cells with low traffic may be deactivated (switched off), traffic of UEs served by deactivated cells may be offloaded to other cells, and actions may be performed to reduce the load of certain cells. Other use cases include load balancing, where ML models may be used to help distribute loads evenly among cells and among areas of cells, and mobility optimization, where ML models may be used to help predict mobility and performance based on UE location.

ML-based models may also be used to enhance channel state information (CSI) feedback. In such cases, ML models may help reduce overhead and improve accuracy based on predictions. ML models may also be used to enhance beam management, for example, using beam prediction in the time domain, and/or spatial domain for overhead and latency reduction and beam selection accuracy improvement. ML-based models may also be used to enhance positioning accuracy for different scenarios.

Model training and the actual inference using a model may be performed at various locations, based on data collected by different entities. For example, depending on the ML use case, the data collection process can be performed at the user equipment (UE) side (e.g., through measuring some reference signals), at the network (e.g., gNB or Operations, Administration and Maintenance (OAM) function) side, or using some form of cooperation between both the network and the UE(s). In some cases, data collected at different UEs can be shared later with the network to train a global model that accounts for different environmental conditions. Even multiple gNBs and other core network (CN) entities can exchange data/model updates to train a robust ML model that could work in different settings. In some scenarios, federated learning can be applied, where UEs can train their local models and share model updates with the network.

Unfortunately, the data collection process for ML model training presents some challenges that could compromise training performance. For example, if an adversarial UE knew they were participating in the data collection, they could inject perturbed measurements or perturbed model updates to intentionally mislead the ML model. Further, since federated learning has many use-cases, the UEs can have good knowledge of the ML model used in making the decision at the network side. Hence a hostile UE could better optimize an attack (data perturbation) based on knowledge of the model to confuse the ML model.

In some cases, UEs participating in data collection (and/or their data sets) may be classified as trusted or adversarial. The classification may be based on what is referred to as a trust evaluation. The trust evaluation may classify, as adversarial UEs, any UE that shares perturbed data whether intentionally, as in the case of a hostile UE, or unintentionally, as in the case of a legitimate UE with unclean data (e.g., due to some type of malfunction at the UE) that could lead to poisoning of the data pool. Data of different trusted UEs could fall into (be suitable for) multiple ML models scenarios, which is referred to as scenario evaluation. For example, consider the use case of ML-based interference prediction, the network could have one ML model that deals with interference prediction in high-interference environments and one that addresses interference prediction in low interference environments.

In many cases, trust and/or scenario evaluations could be temporarily affected by some conditions, meaning results of a previously performed evaluation may no longer be valid. For example, a UE may experience a temporary outage (e.g., due to damage or overheating) that impacts its previous trust evaluation. Thus, even UEs previously classified as trusted, should be re-evaluated in some cases. As another example, an adversarial UE could share clean data in initial data collections to gain the trust of the network, but may later begin sending perturbed data to achieve its goals. Further, scenario evaluation of the UE could also change due to some external events. For example, in the use-case of ML-based interference prediction, a cell-edge UE affected by high interference could move close to the cell-center and, thus, be affected by weaker interference conditions.

Aspects of the present disclosure, however, may help address these potential issues by triggering reevaluation trust and/or scenario of UEs that participate in data collection for ML model training. Based on certain trigger events, one or more network entities may request an evaluation (or reevaluation) of suitability of a UE for data collection for ML model training and/or scenario evaluation.

As a result, in the event one or more conditions render results of a previous evaluation invalid, the triggered reevaluations may help avoid adverse impacts, by allowing UEs to be reclassified (e.g., a UE previously classified as trusted may be reclassified as adversarial or a UE previously classified as adversarial may be reclassified as trusted). Thus, the techniques may help ensure that only suitable data sets are used for training, which may lead to improved overall performance of ML models.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
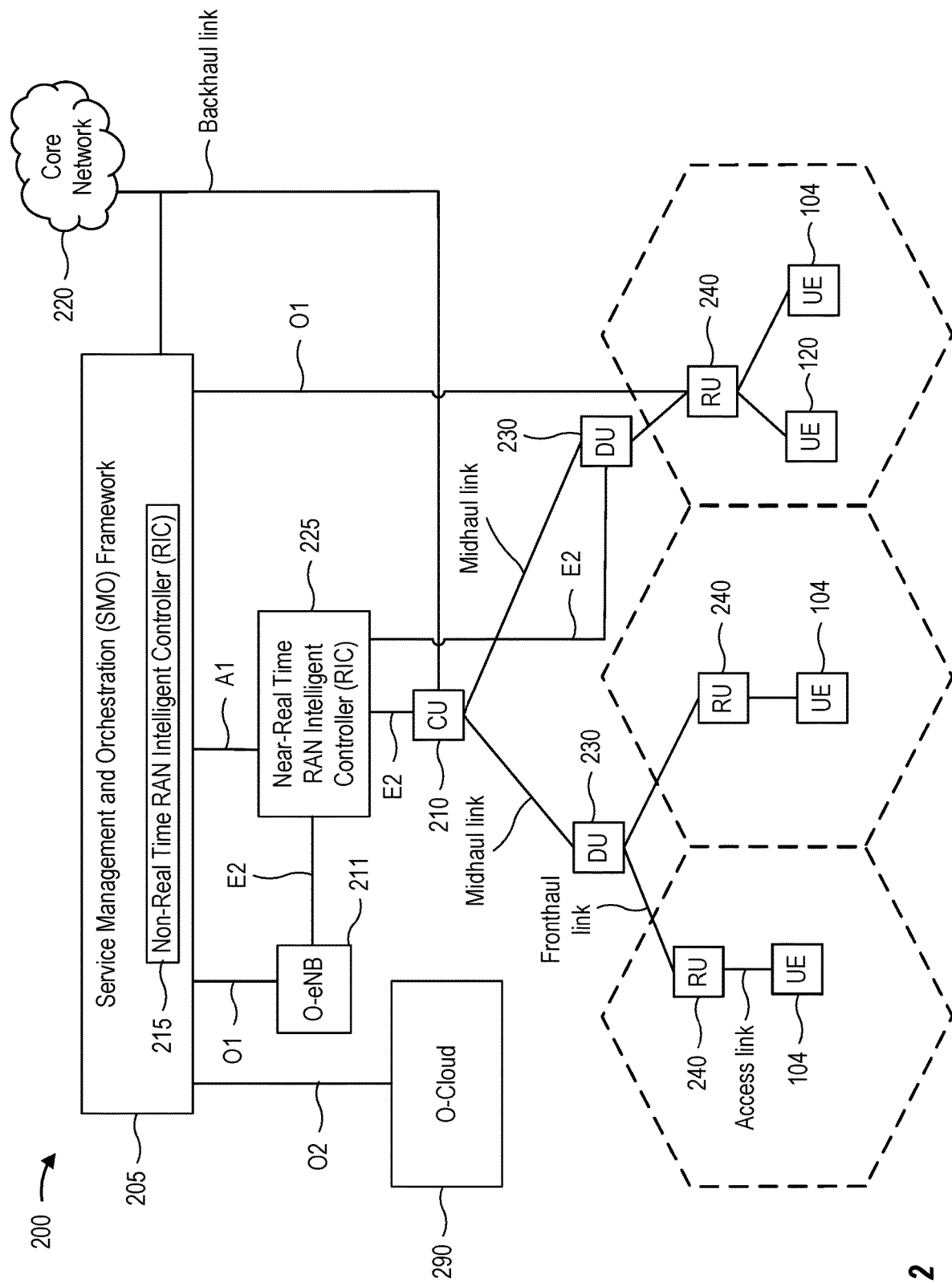
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
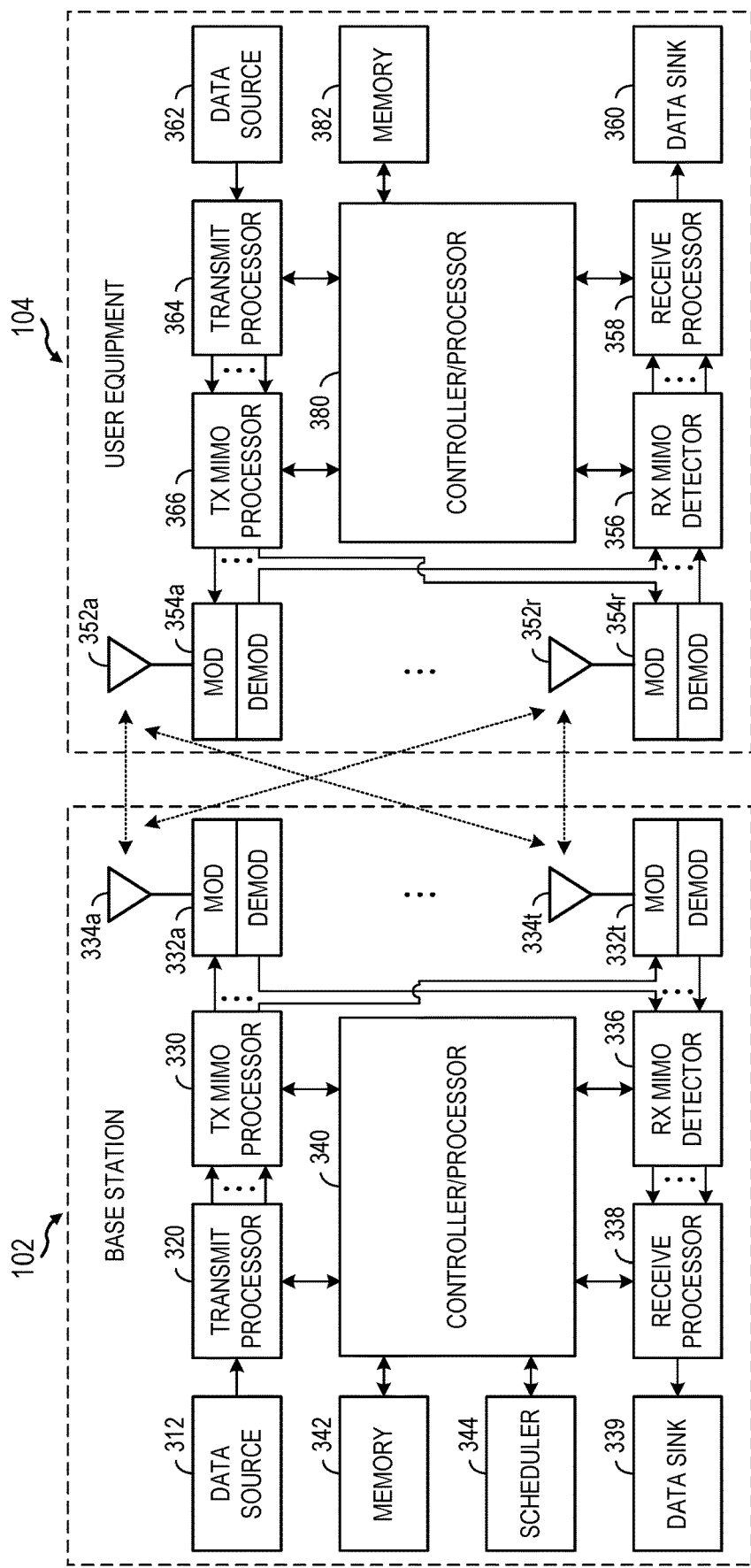
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Framework for AI/ML in a Radio Access Network

Figure 5:
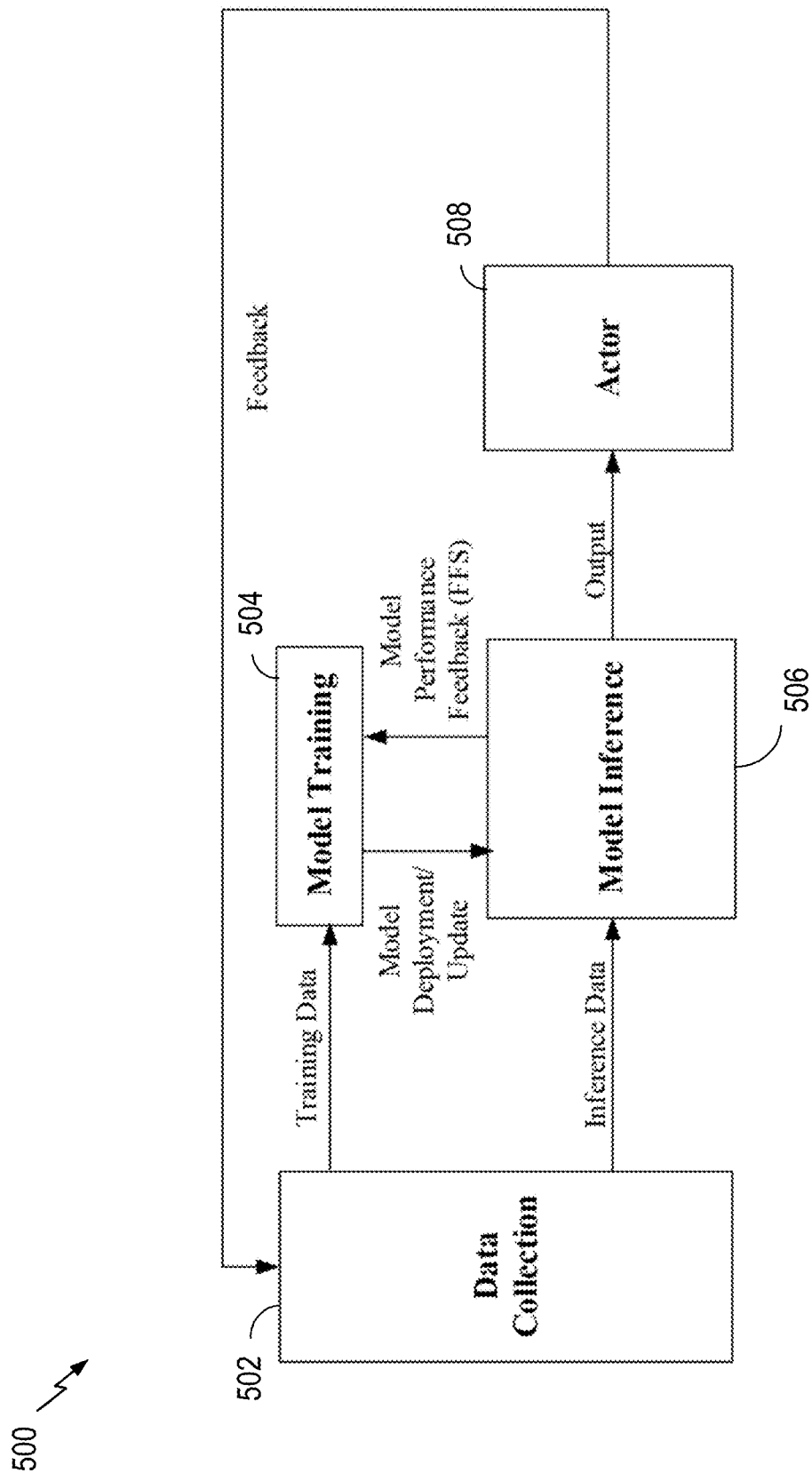
FIG. 5 depicts an example of AI/ML functional framework 500 for RAN intelligence, in which aspects described herein may be implemented.

FIG. 5 depicts an example of AI/ML functional framework 500 for RAN intelligence, in which aspects described herein may be implemented.

The AI/ML functional framework includes a data collection function 502, a model training function 504, a model inference function 506, and an actor function 508, which interoperate to provide a platform for collaboratively applying AI/ML to various procedures in RAN.

The data collection function 502 generally provides input data to the model training function 504 and the model inference function 506. AI/ML algorithm specific data preparation (e.g., data pre-processing and cleaning, formatting, and transformation) may not be carried out in the data collection function 502.

Examples of input data to the data collection function 502 (or other functions) may include measurements from UEs or different network entities, feedback from the actor function, and output from an AI/ML model. In some cases, analysis of data needed at the model training function 504 and the model inference function 506 may be performed at the data collection function 502. As illustrated, the data collection function 502 may deliver training data to the model training function 504 and inference data to the model inference function 506.

The model training function 504 may perform AI/ML model training, validation, and testing, which may generate model performance metrics as part of the model testing procedure. The model training function 504 may also be responsible for data preparation (e.g., data pre-processing and cleaning, formatting, and transformation) based on the training data delivered by the data collection function 502, if required.

The model training function 504 may provide model deployment/update data to the Model interface function 506. The model deployment/update data may be used to initially deploy a trained, validated, and tested AI/ML model to the model inference function 506 or to deliver an updated model to the model inference function 506.

As illustrated, the model inference function 506 may provide AI/ML model inference output (e.g., predictions or decisions) to the actor function 508 and may also provide model performance feedback to the model training function 504, at times. The model inference function 506 may also be responsible for data preparation (e.g., data pre-processing and cleaning, formatting, and transformation) based on inference data delivered by the data collection function 502, at times.

The inference output of the AI/ML model may be produced by the model inference function 506. Specific details of this output may be specific in terms of use cases. The model performance feedback may be used for monitoring the performance of the AI/ML model, at times. In some cases, the model performance feedback may be delivered to the model training function 504, for example, if certain information derived from the model inference function is suitable for improvement of the AI/ML model trained in the model training function 504.

The model inference function 506 may signal the outputs of the model to nodes that have requested them (e.g., via subscription), or nodes that take actions based on the output from the model inference function. An AI/ML model used in a model inference function 506 may need to be initially trained, validated and tested by a model training function before deployment. The model training function 504 and model inference function 506 may be able to request specific information to be used to train or execute the AI/ML algorithm and to avoid reception of unnecessary information. The nature of such information may depend on the use case and on the AI/ML algorithm.

The actor function 508 may receive the output from the model inference function 506, which may trigger or perform corresponding actions. The actor function 508 may trigger actions directed to other entities or to itself. The feedback generated by the actor function 508 may provide information used to derive training data, inference data or to monitor the performance of the AI/ML Model. As noted above, input data for a data collection function 502 may include this feedback from the actor function 508. The feedback from the actor function 508 or other network entities (via Data Collection function) may also be used at the model inference function 506.

The AI/ML functional framework 500 may be deployed in various RAN intelligence-based use cases. Such use cases may include CSI feedback enhancement, enhanced beam management (BM), positioning and location (Pos-Loc) accuracy enhancement, and various other use cases.

Overview of Model Training for in a Radio Access Network

In 5G NR, depending on the ML use case, the data collection process can be performed at the UE side (e.g., through measuring some reference signals), at the gNB side, or by cooperation between both the gNB and the UE. Similarly, ML model training, and use of the ML model for prediction or inference may be performed at the same or different locations.

Figure 6:
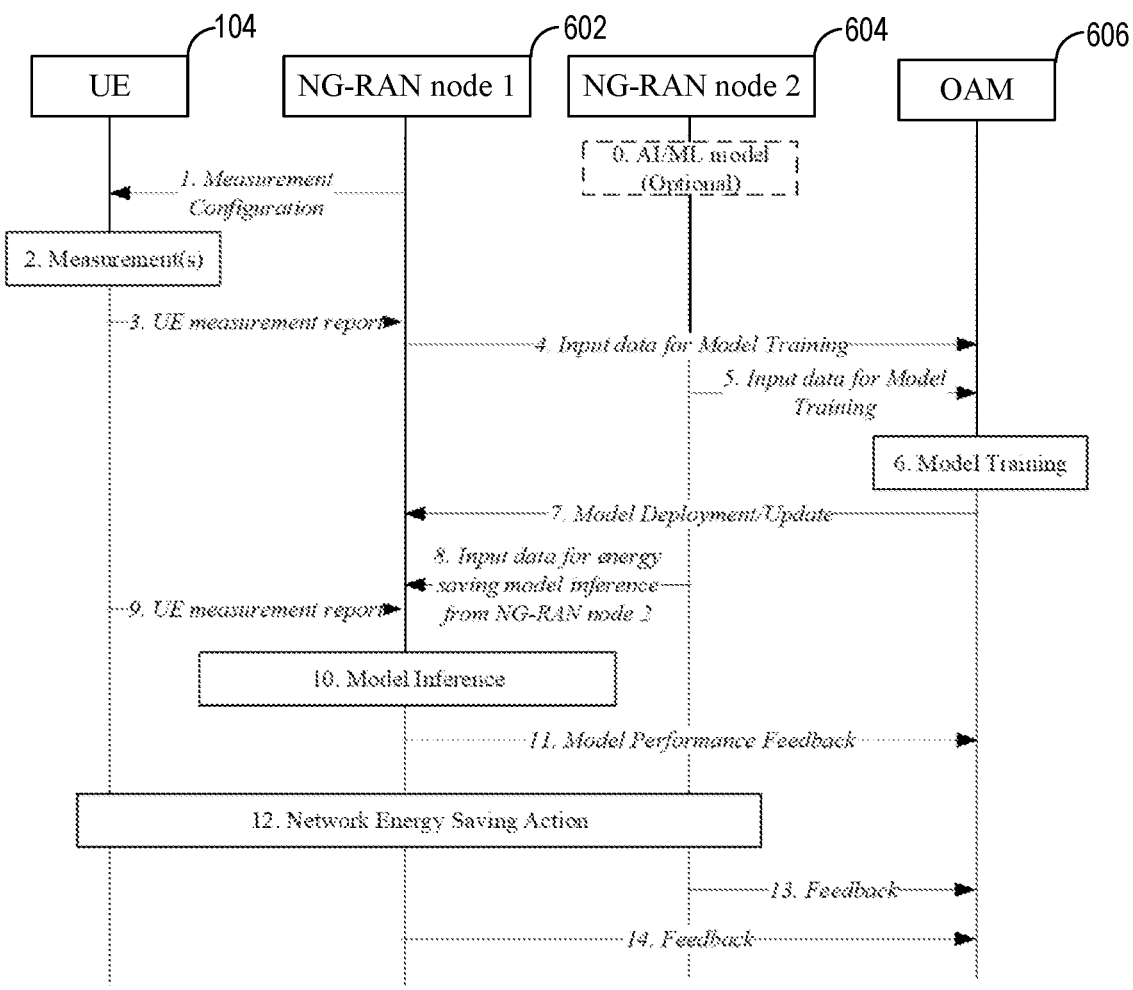
Figure 7:
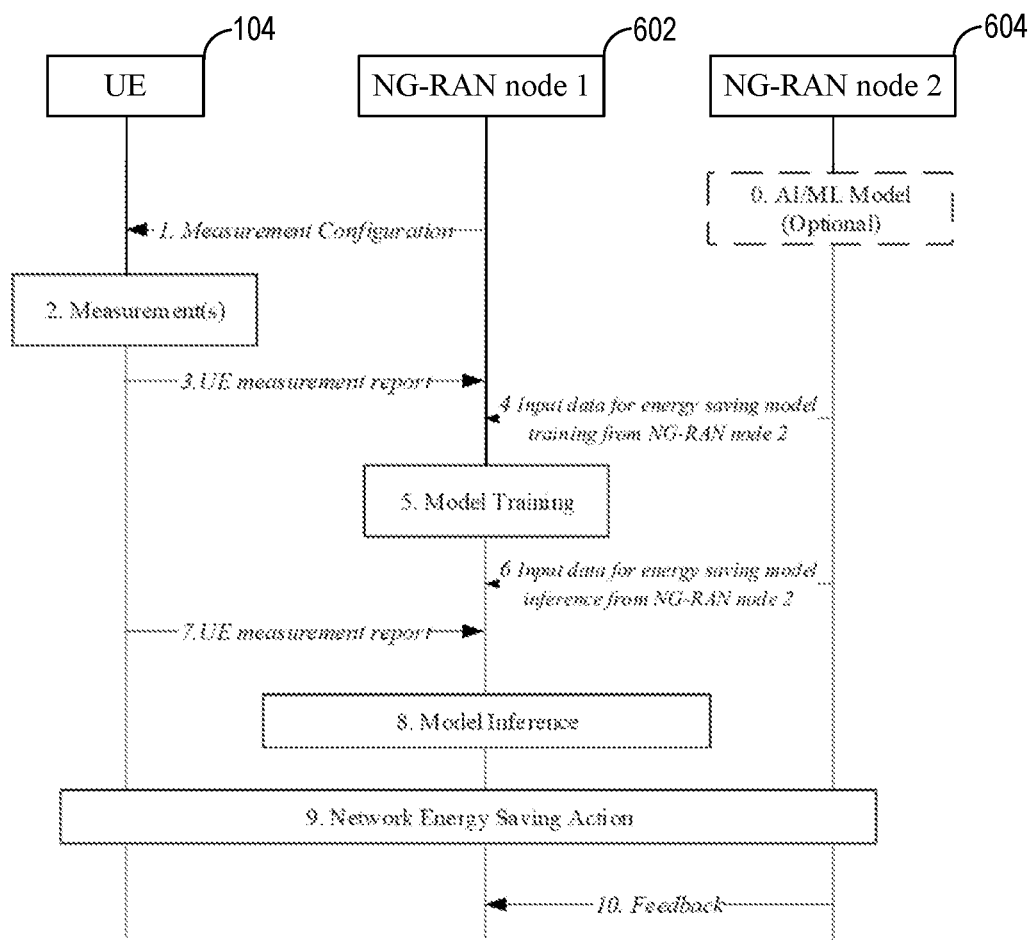
FIG. 7 illustrates a general functional framework applied for AI-enabled RAN intelligence.

For example, for the network energy saving use case illustrated in FIG. 6 and FIG. 7, training and inference may be performed at a next generation radio access network (NG-RAN) node or at an OAM node, while data collection is performed by one or more UEs.

FIG. 6 illustrates an example call flow diagram 600, in which model training is performed at an OAM node 606 and model inference is performed at an NG-RAN node NG-RAN node 1 602, as illustrated, or NG-RAN node 2 604. As illustrated, in this example, one or more UEs 104 participate in data collection, based on measurement reporting. In this use case, the UE and NG-RAN node(s) may perform one or more network energy savings actions, based on the ML model inference.

FIG. 7 illustrates another example call flow diagram 700, in which model training and model inference are both performed at the NG-RAN nodes, while one or more UEs participate in data collection. Again, in this use case, the UE and NG-RAN node(s) may perform one or more network energy savings actions.

In general, data collected at different UEs can be shared later with the network (e.g., gNB) to train a global model that accounts for different environmental conditions. Even multiple gNBs and other core network (CN) entities can exchange data/model updates to train a robust ML model that can work in different settings. In addition, in 5G NR, federated learning can be applied, where UEs can train their local models and share model updates with the gNB.

As noted above, however, the data collection process for ML model training presents some challenges that could compromise training performance. For example, if an adversarial UE knew they were participating in the data collection, they could inject perturbed measurements or perturbed model updates to intentionally mislead the ML model. Further, since federated learning has many use-cases, the UEs could have good knowledge of the ML model used in making the decision at the network side. Hence a hostile UE could better optimize an attack (data perturbation) based on knowledge of the model to confuse the ML model.

A hostile UE intentionally sharing perturbed data to poison the data pool is generally referred to as a poisoning attack, while a legitimate UE with unclean data (e.g., due to malfunction at the UE) also leads to poisoning of the data pool.

In a poisoning attack, an adversarial UE injects perturbed data into the ML model training pool. Consequently, the ML model is trained to make errors and its performance is significantly impacted. One common result of a poisoning attack is that the model decision boundary shifts in some way. This impact is illustrated in FIGS. 8A and 8B, which considers an example of an ML-based linear two-class classifier.

Figure 8A:
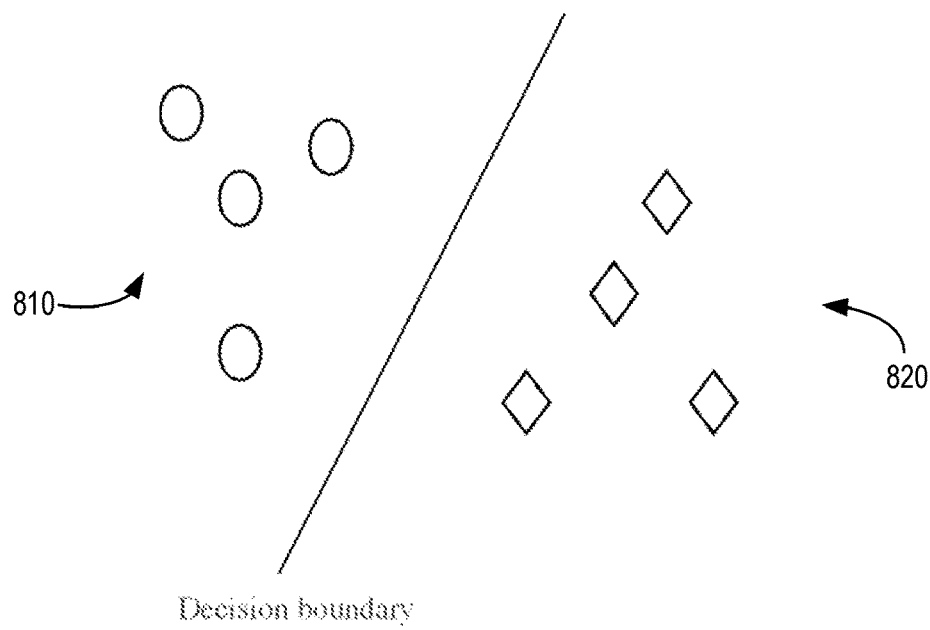
FIGS. 8A and 8B depict an example of the potential impact of corrupted data sets.

FIG. 8A shows the proper decision boundary, based on legitimate data sets 810 and 820. In other words, data points occurring on one side of the boundary result in the model picking a first classification, while data points occurring on the other side of the boundary result in the model picking a second classification. FIG. 8B illustrates how injecting a single data point 822 (e.g., via a poisoning attack or a legitimate UE with unclean data) can significantly affect the model decision boundary.

Figure 8B:
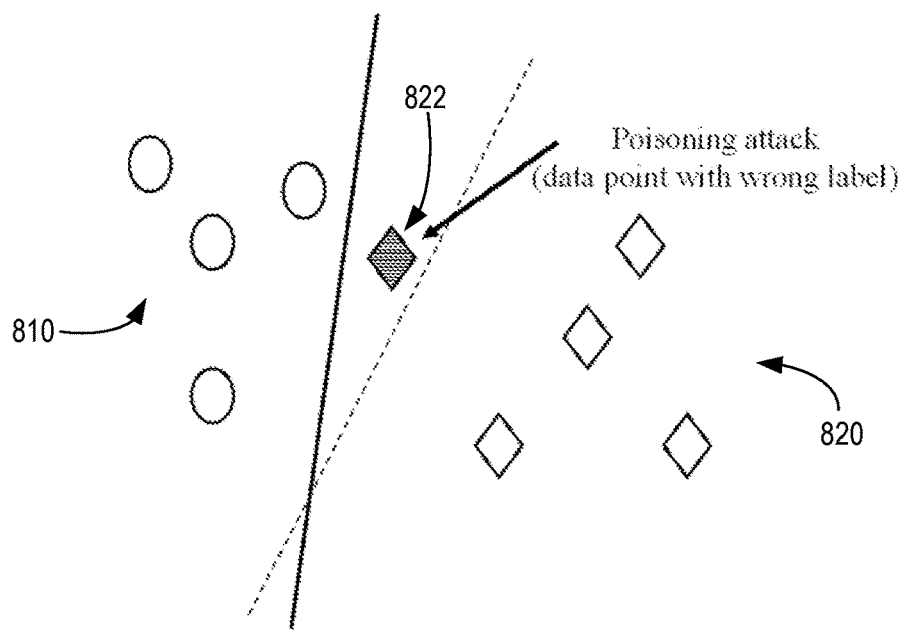

While the example illustrated in FIGS. 8A and 8B assume an ML-based linear two-class classifier, the same potential challenge and impact of unclean data applies to any ML model.

Poisoning attacks typically have one of two goals, impacting reliability or targeting a definite prediction. Reliability attacks typically aim to inject so much perturbed data into the data pool that would result in changing the model boundaries, as described above which, would affect the overall performance of the model. As illustrated by the example shown in FIG. 8B, a relatively low percentage of training data set poisoning may lead to a significant drop in the accuracy performance.

In targeted attacks, an adversarial UE (or UEs) typically aim to induce a definite prediction from the machine learning model (e.g., effectively accessing a backdoor in the ML model). a targeted attack typically changes the behaviors of the model on some specific data instances (chosen by the attackers) while keeping the model performance on the other data instances unaffected so that the model designer remains unaware of the attack.

Figure 9:
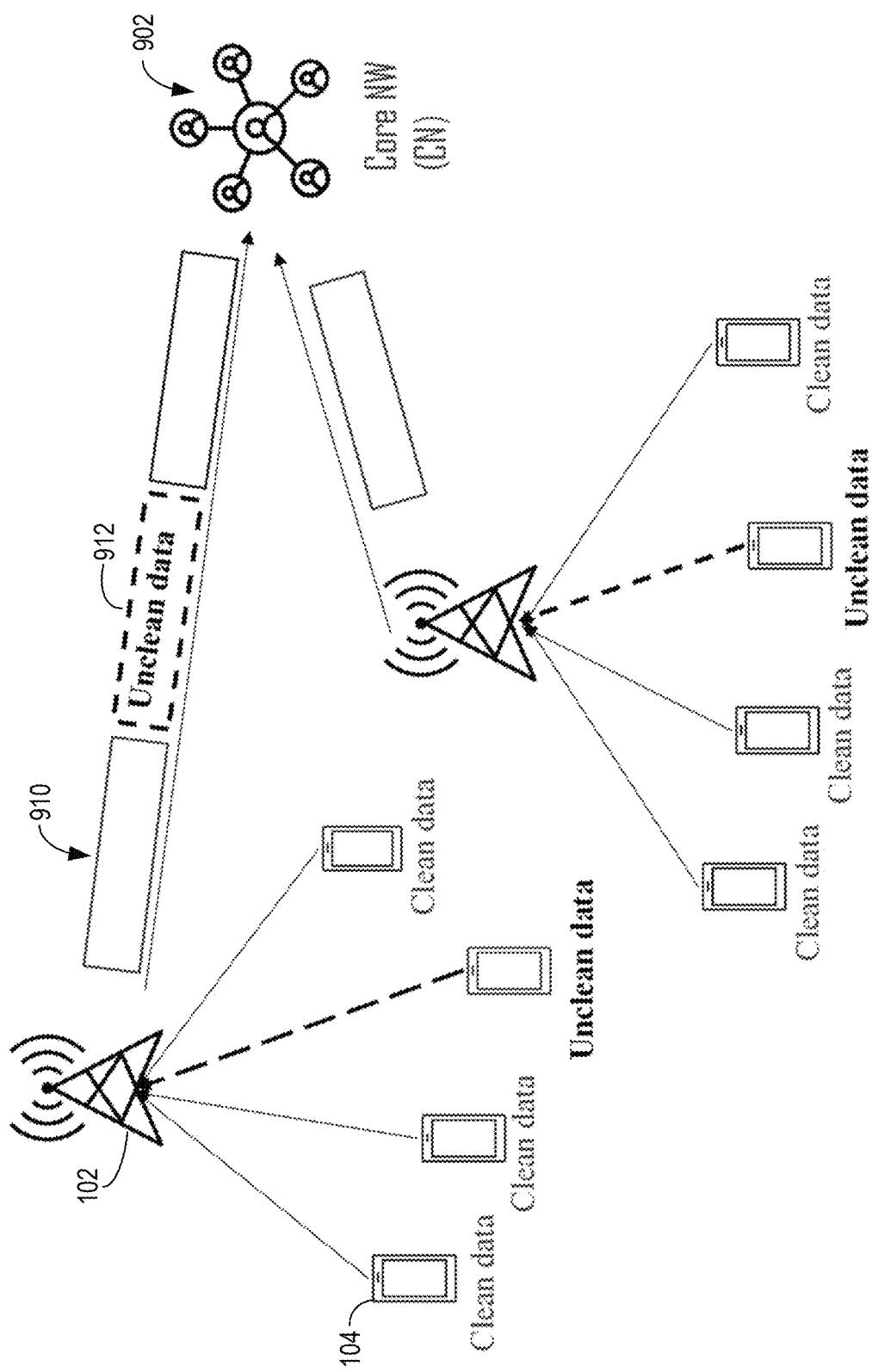
FIG. 9 depicts examples scenarios of reporting corrupted data sets.

FIG. 9 illustrates how ML model training data sets 910 may include unclean/corrupted data 912. As noted above, even if the corruption was not intentional, it can lead to the same results. The example assumes the training data sets are sent to a core network (CN) node 902.

An adversarial UE (or user thereof) may have physical access to their own device and, hence, may have ability to install malicious software that enables the UE to perturb reported measurements. In certain services, such as 3GPP location services, the UE (for which the location is to be determined) performs measurements itself and sends these measurements to the network so the network can determine its location. It may be advantageous for a UE to appear to be located somewhere else than it actually is. This can be done by the UE by faking these measurements or by altering the measured values before sending these to the network.

Certain mechanisms may be able to detect corrupted data sets, whether the source of error is a hostile UE intentionally corrupting the data or a malfunctioning UE corrupting the data. These mechanisms may be able to detect corrupted datasets, so that they can be excluded from model training (and/or testing). In general, these mechanisms may be applied assuming that data sets reported by the UE(s) are not trusted.

One example mechanism designed to reject datasets is based on the detection of datasets that result in a negative impact. In general, the network can utilize the availability of a trusted dataset to identify perturbed/corrupted datasets using this approach. The network can use a specific candidate dataset to train its ML model. Then, it can test the model performance on a trusted dataset. If the ML model performance is unexpectedly low, the network (e.g., gNB) should be less confident on the candidate dataset. The network can test the performance of a candidate dataset on a previously trained ML model with trusted data.

In some cases, to obtain a trusted dataset, the NW can perform data collection procedures (or campaigns) to collect an initial trusted dataset (e.g., using its trusted gNBs and/or its trusted UEs). Even if the network has its own trusted dataset, it may be important to train its ML model using more than just the trusted dataset. For example, to train a robust ML model that can generalize to work well in different operating conditions, a diverse dataset may be needed that spans the different environment conditions, scheduling scenarios, interference scenarios, traffic types, loading/resource utilization, number of active beams/TCI states, different locations, and the like.

Collecting trusted datasets (e.g., using trusted UEs) is relatively costly. Hence, it may be beneficial for the network to obtain an initial trusted dataset and then collect data from other UEs to obtain more diverse datasets. Finally, the NW may test the legitimacy and the cleanness of the datasets collected by other UEs.

Figure 10:
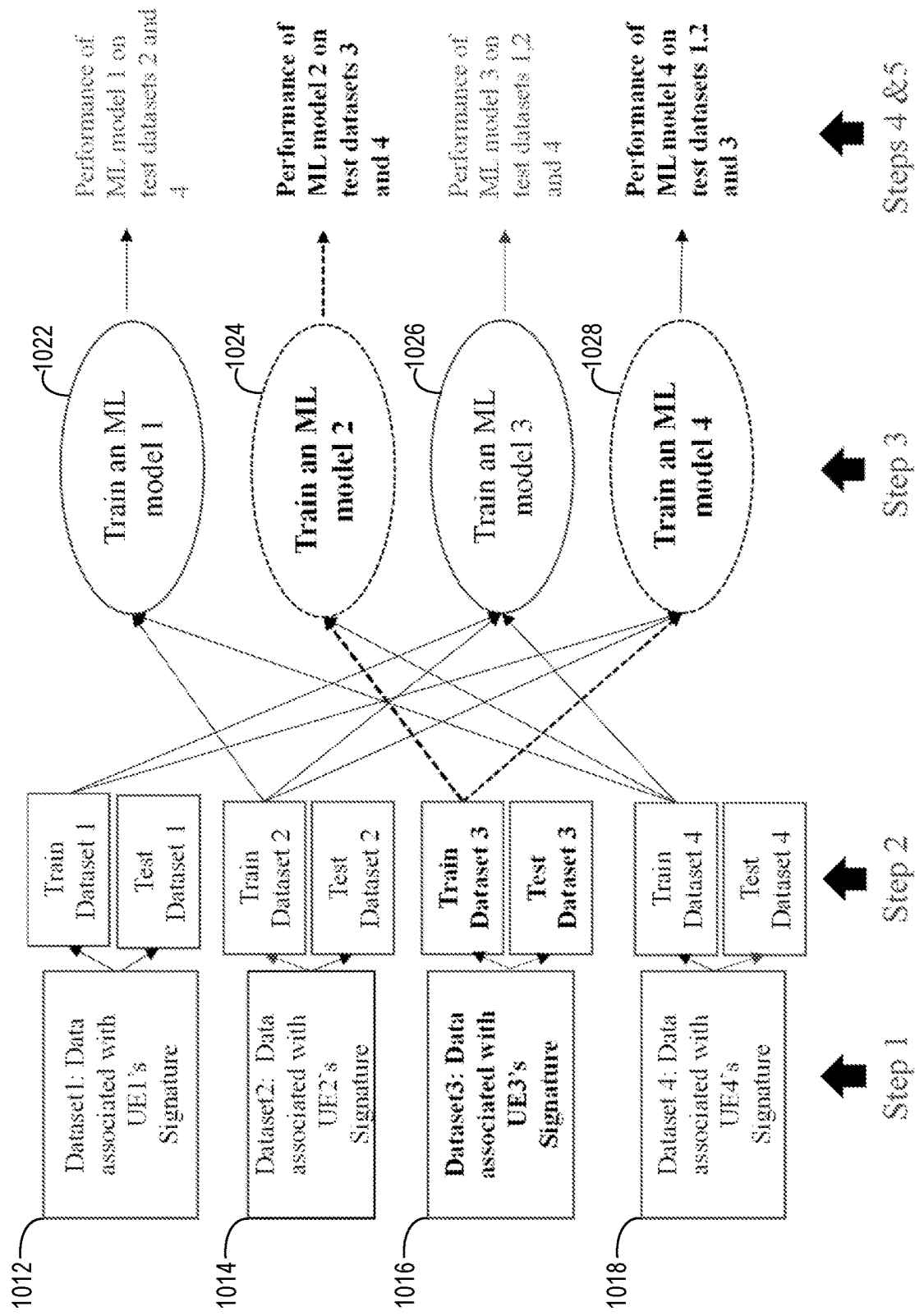
FIG. 10 depicts an example of how to detect corrupted data sets.

FIG. 10, illustrates one mechanism for testing the legitimacy and the cleanness of datasets collected by other UEs and to reject datasets on negative impact.

As illustrated, in a first step (Step 1), the network groups all data associated with a specific signature together into specific dataset. In the illustrated example, the NW utilized the UE signature to group similar data together (data set 1012 associated with UE1, data set 1014 associated with UE2, data set 1016 associated with UE3, and data set 1018 associated with UE4).

In a training step (Step 2), the network divides the data associated with each signature into training and testing. In a third step (Step 3), the network trains multiple ML models using different combinations of the training segment of the different datasets, as shown at 1022, 1024, 1026, and 1028. The combination of candidate datasets included in training different ML models can vary based on implementation.

The network may then perform additional steps to detect corrupted datasets, and then reject datasets that result in a negative impact, as determined by performance monitoring. For example, in a fourth step (Step 4), the network may test each ML model using the test datasets corresponding to the ones used in training. In a fifth step (Step 5), the network may then monitor the performance gap between these ML models and observe if a candidate dataset is common across the ML models with degraded performance.

In the illustrated example, the network finds a drop in performance in models 2 and model 4. Hence, the network can conclude that dataset 3 (common to training model 2 and model 4) is the cause of this performance drop. Thus, dataset 3 may be considered untrusted.

Other schemes may also be used to detect adversarial datasets. One example scheme is gradient shaping, in which existing methods for generating poisoned samples may be calculated by gradient-based techniques and used to differentiate poisoned data samples from those of legitimate samples. Using a machine learning scheme, generative adversarial networks (GANs) may be used to reconstruct participant training data using partial trusted data and to assign labels based on the predicted results. A participant may then be recognized as an attacker if the accuracy for this participant model is lower than a properly chosen threshold. Which scheme or combination of schemes the network deploys to detect adversarial datasets may be up to implementation.

As noted above, another type of evaluation that may be performed to determine the suitability a UE (or UE data set) for data collection is scenario evaluation. Scenario evaluation may be important because ML models are typically designed to work properly when the dimensions and distribution of the input features to an ML model remain the same during training and inference. Therefore, if the dimensions of the input to an ML model change during inference (e.g., from when training), the ML model may not work. In some cases, even if the input dimensions are the same, but the distribution of the input to an ML model changed significantly during inference, the performance of the ML model may degrade substantially.

Hence, typically the ML engine (e.g., at the gNB/UE/CN) may have multiple ML models and switch between them according to a given scenario. The UE/gNB typically receives and measures some signals including reference signals (e.g., CSI-RS, DMRS, and/or SSBs), and the measurements are then utilized as input to its ML model. However, the distribution of reference signals (which are used as input to ML models) may vary, for example, according to the environment conditions. Therefore, a scenario evaluation may be performed, such that the ML model is re-evaluated to ensure that the ML model most suitable to the current environment is the one currently operating.

Aspects Related to Trust Re-Evaluation for UEs

Aspects of the present disclosure provide apparatuses, methods, processing systems, and computer-readable mediums for trust and/or scenario reevaluation for devices involved in data collection for model training.

According to certain aspects, a database may be created for UEs participating in data collection. As noted above, UEs participating in data collection (and/or their data sets) may be classified as trusted or adversarial. The classification may be based on what is referred to as a trust evaluation.

The trust evaluation may classify, as adversarial UEs, any UE that shares perturbed data whether intentionally, as in the case of a hostile UE, or unintentionally, as in the case of a legitimate UE with unclean data (e.g., due to some type of malfunction at the UE) that could lead to poisoning of the data pool. Data of different trusted UEs could fall into (be suitable for) multiple ML models scenarios, which is referred to as scenario evaluation. For example, consider the use case of ML-based interference prediction, the network could have one ML model that deals with interference prediction in high-interference environments and one that addresses interference prediction in low interference environments Aspects of the present disclosure may help address the potential issues caused when trust and/or scenario evaluations are temporarily affected by some conditions, such that the results of a previously performed evaluation are no longer be valid.

As will be described in greater detail below, trust and/or scenario reevaluation of UEs that participate in data collection for ML model training may be triggered based on certain conditions. Based on certain trigger events, one or more network entities may request an evaluation (or reevaluation) of suitability of a UE for data collection for ML model training and/or scenario evaluation.

Certain aspects of the present disclosure provide details of signaling between entities (network entities and UE) that may help trigger and perform the trust and scenario re-evaluation for the UEs (or their datasets). In some cases, a network entity (e.g., a gNB or CN node) may transmit a request for an evaluation (re-evaluation) of suitability of at least one user equipment (UE) for data collection for at least one of machine learning (ML) model training or scenario evaluation, when one or more trigger conditions are met.

Figure 11:
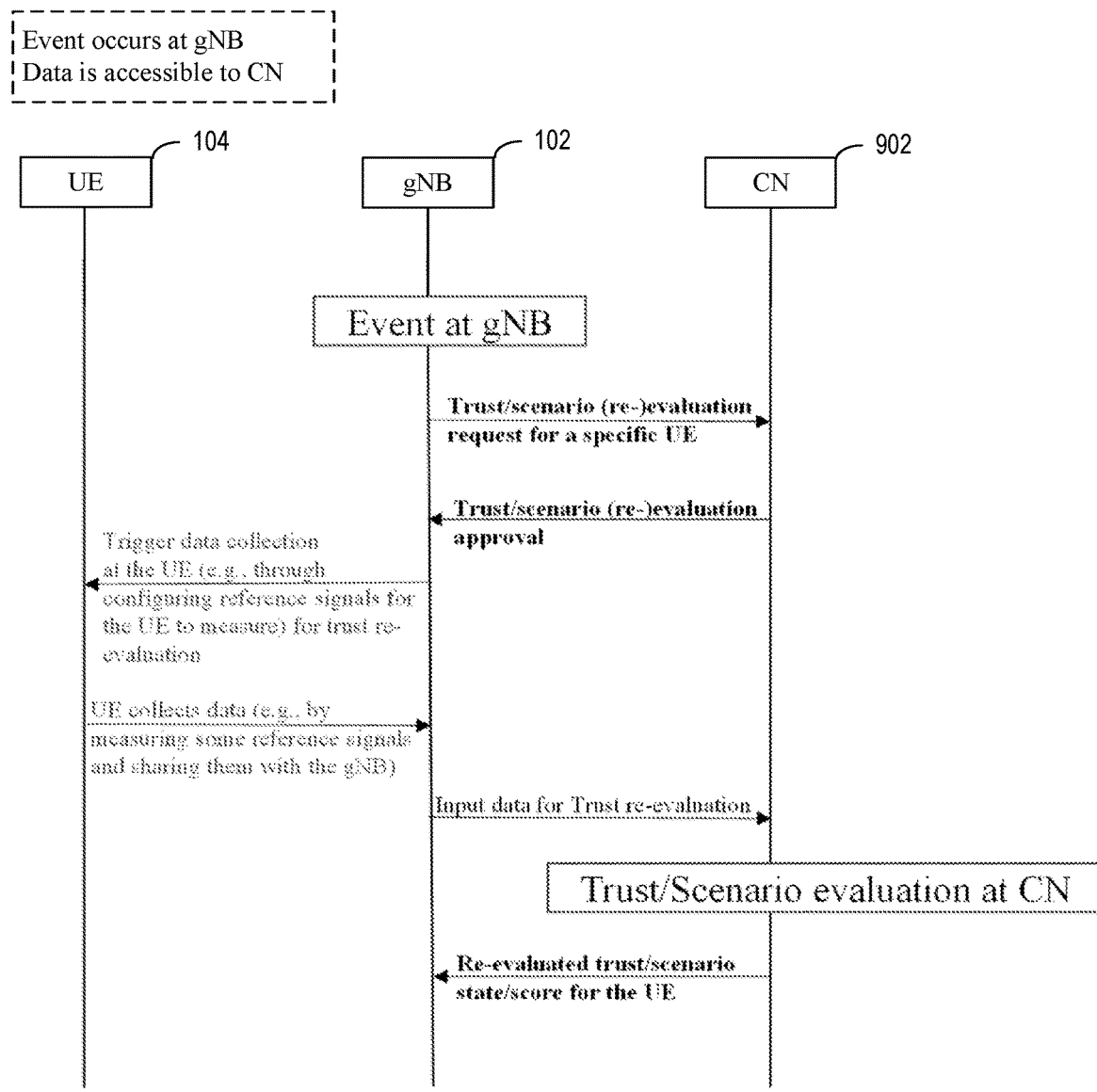
FIGS. 11 and 12 depict example call flow diagrams for UE trust reevaluation, in accordance with aspects of the present disclosure.
Figure 12:
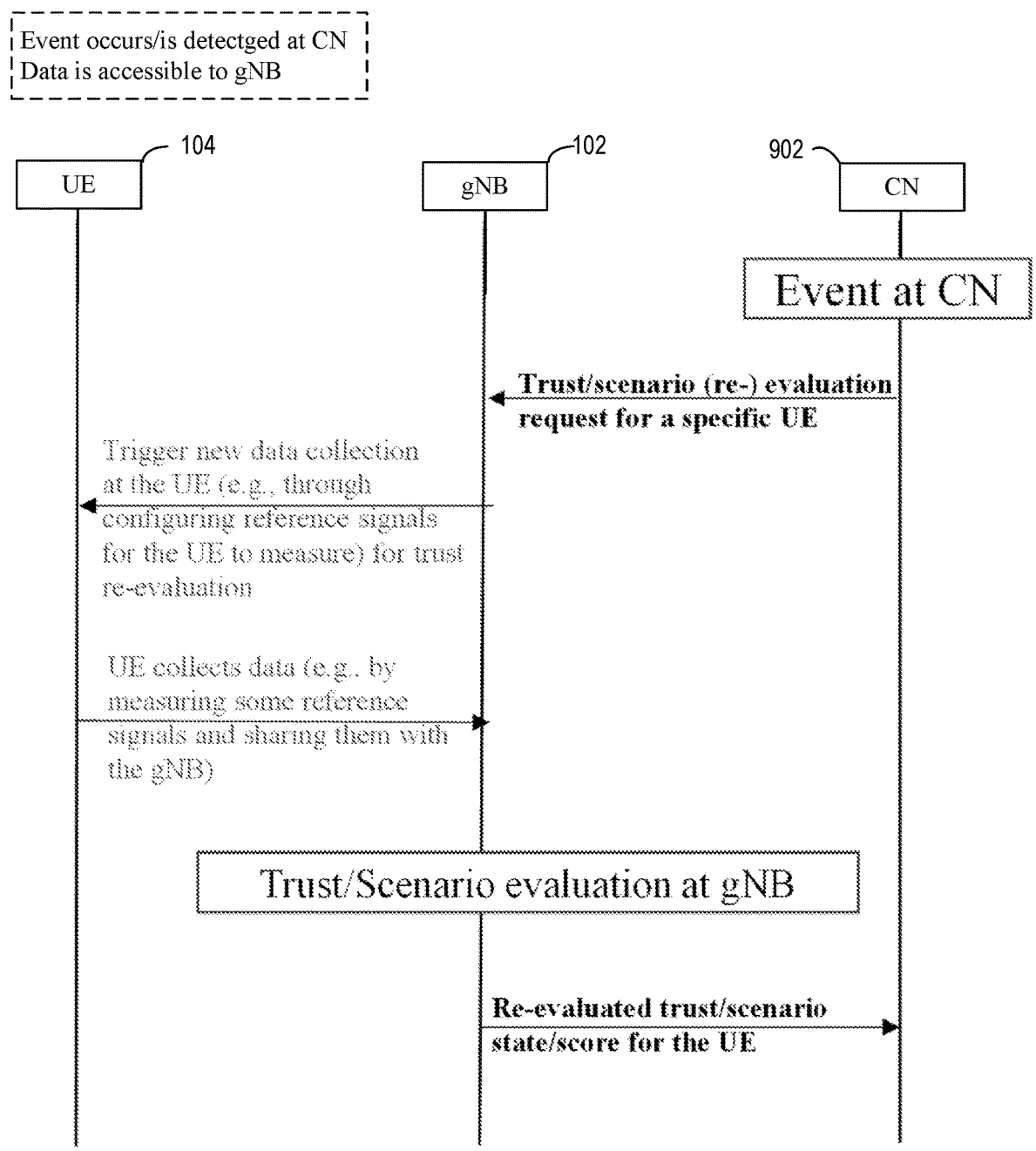

The techniques for triggering trust and/or scenario reevaluation proposed herein may be understood with reference to the call flow diagrams 1100 and 1200 of FIGS. 11 and 12.

The gNB depicted in FIG. 11 and/or FIG. 12 may be an example of a network entity, such as the BS 102 depicted and described with respect to FIGS. 1 and 3 or a disaggregated base station depicted and described with respect to FIG. 2. Similarly, the UE depicted in FIG. 10 and/or FIG. 12 may be an example of UE 104 depicted and described with respect to FIGS. 1 and 3.

Referring to FIG. 11, in the illustrated example, a triggering event may occur (and/or be detected) at the gNB, while the data sets are accessible to a CN node 902.

In this case, the gNB may request to an ML engine (e.g., located at an OAM or other CN node) for trust/scenario re-evaluation of a specific UE (or UE dataset). This approach may be suitable when data is stored at the CN. Typically, the CN may maintain a database to store data sets for UEs participating in the data collection. The CN may also maintain a database of untrusted UEs (a black-list) and/or a database of trusted UEs (a white list). In some cases, a trust score may be associated with the trusted (and/or untrusted) UEs.

The gNB could initiate (trigger) a trust/scenario re-evaluation request for a specific UE based on observation of the UE behavior or based on specific event. Some example events at the network entity (e.g., gNB) that could trigger a trust/scenario re-evaluation include handover of the at least one UE from a first RAN node to a second RAN node, a change in channel state information (CSI) measurements reported by the at least one UE, a change in measurements of sounding reference signals (SRS) transmitted from the at least one UE, a radio link failure (RLF) or RLF recovery of the at least one UE, or a change in scheduling behavior at the network entity (e.g., gNB).

Different schemes may be used to re-evaluate the trust of a specific UE or UE data-set. For example, the algorithm described with reference to FIG. 10 may be used to evaluate data sets based on negative impact.

As illustrated in FIG. 11, in some cases, the gNB may receive, from the CN node, approval to trigger the evaluation. In response, the gNB may transmit, to the UE, signaling to trigger data collection. The gNB may then receive data collected at the UE and forward that data to the CN node. Results of the (re-)evaluation may be based on this data.

Referring to FIG. 12, in the illustrated example, the CN node 902 (e.g., OAM) may trigger a UE trust/scenario re-evaluation request and sends it to the gNB. This approach may be suitable, for example, when data is stored at the gNB.

Some example events at the CN node that could trigger a trust/scenario re-evaluation include handover of the UE from a first RAN node (gNB) to a second RAN node (gNB) or a threshold amount of time having passed since a previous evaluation of suitability of the at least one UE for data collection for at least one of ML model training or scenario evaluation.

For the latter, the CN node may record the last time the trust of a specific UE was evaluated for data collection. In some cases, the CN may signal an untrusted duration for the gNB, after which the same UE could participate again in the data collection or be re-evaluated for the data collection.

In some cases, a UE re-evaluation for data collection may be triggered when data collection for a different use-case is triggered. For example, if the UE had an un-trusted state due to its data collection in a specific use case (e.g., interference prediction), and the network needs to collect data for a different use-case (e.g., beam management) in the coverage area of this UE, a trust re-evaluation could be triggered (which may result in a previously un-trusted UE being classified as trusted).

In some cases, re-evaluation may be performed periodically. In some cases, periodic re-evaluation could be based on a request from the CN node. In other cases, periodic re-evaluation may be performed without any request/initiation signaling.

In some cases, a UE may request a trust/scenario re-evaluation for themselves. For example, in some scenarios, a UE may request to re-evaluate their trust, based on measuring some reference signals and observing significant enhancements/degradation in the channel/interference qualities. In such cases, the UE request for reevaluation may be sent via radio resource control (RRC), medium access control (MAC) control element (CE), or uplink control information (UCI).

As illustrated in FIG. 11 and FIG. 12, in some cases, a network entity may share information related to a reevaluation with another network entity. For example, the gNB may share with the CN node or the CN node may share with the gNB a re-evaluated UE trust/scenario state. In such cases, the re-evaluated trust state could indicate: an untrusted UE whose data that should be excluded from training, a trusted UE (whose data can be used in training an ML model), or a UE that needs further evaluation.

For an untrusted UE, a reason or reason for excluding the UE or UE data set from data collection may be indicated. Such reasons may include, for example, the UE has been determined to be an adversarial UE intentionally sharing perturbed data or that the UE has highly noisy data or highly corrupted data due to overheating, damage or malfunction at the UE. For a UE that needs further evaluation, the network entity may be unable to determine the UE state with sufficient confidence. In this case, more data collection for this UE could be triggered to further evaluate the trust state.

For each of these trust states, a trust score could also be associated with the UE. A network entity may also share a scenario state of collected data.

In some cases, trust and/or scenario re-evaluation may be restricted to specific UEs. For example, event-triggered rust (re-)evaluation could be applied only to UEs participating in the data collection.

In some cases, trust re-evaluation could be applied to untrusted UEs only. In some cases, trust re-evaluation for untrusted UEs could be stricter than initial trust evaluation. For example, trust re-evaluation for untrusted UEs could use stricter measures when applying the reject on negative impact algorithm shown in FIG. 10. This may include testing the UE dataset on more ML models and/or using a stricter threshold in the gap in performance.

In some cases, trust re-evaluation could be applied to trusted UEs only. In some cases, trust re-evaluation for trusted UEs could be less strict than that of initial trust evaluation.

In some cases, trust re-evaluation could be based on a previous trust score of a UE. For example, if a specific UE had a very low trust score, then the time duration before which that UE trust should be re-evaluated should be higher than another UE having a low trust score.

In some cases, scenario (re-)evaluation could applied to specific UEs, as well. For example, scenario (re-)evaluation could applied to be applied to UEs whose datasets apply to a specific scenario.

As described herein, aspects of the present disclosure may help address these potential issues by triggering reevaluation trust and/or scenario of UEs that participate in data collection for ML model training. As a result, the techniques may help ensure that only suitable data sets are used for training, which may lead to improved overall performance of ML models.

Example Operations of a First Network Entity

Figure 13:
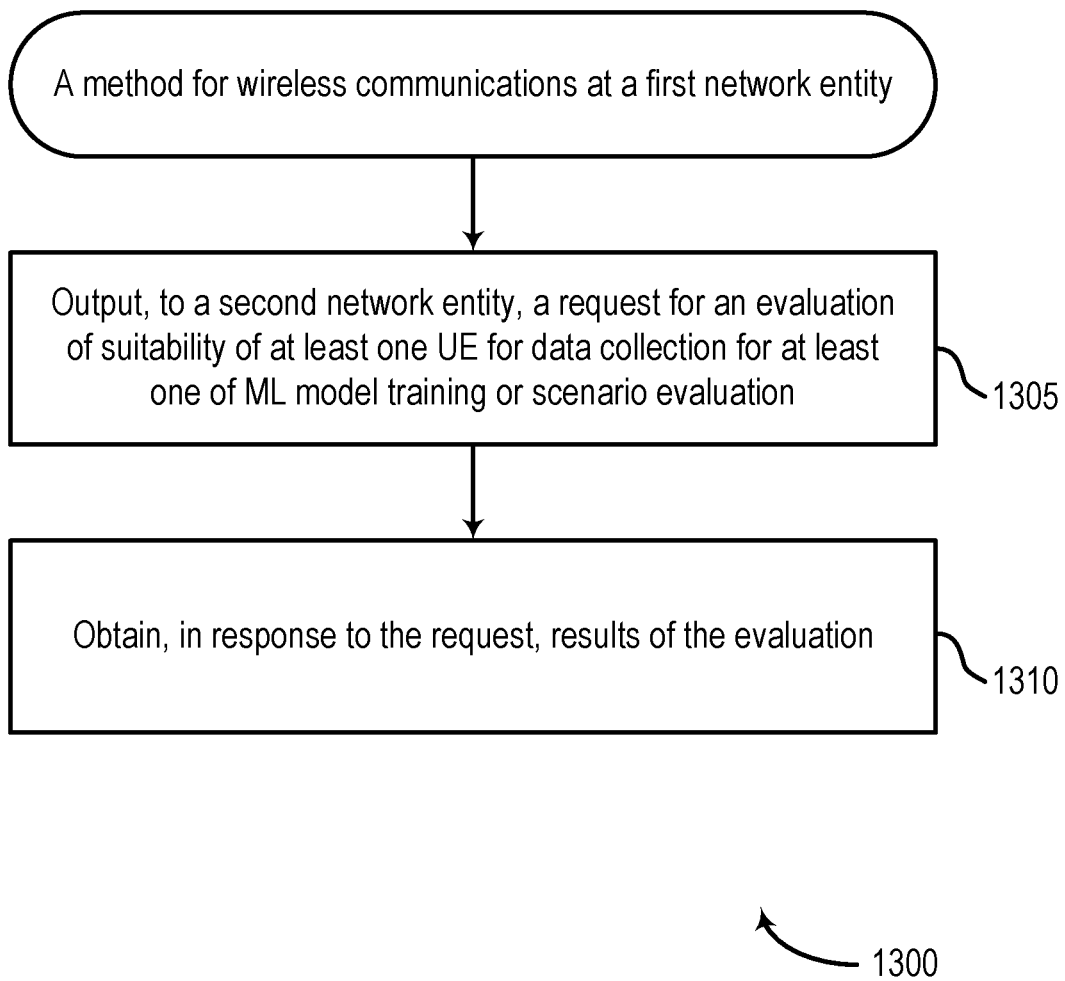
FIG. 13 depicts a method for wireless communications.

FIG. 13 shows an example of a method 1300 of wireless communication at a first network entity, such as a BS 102 of FIGS. 1 and 3, or a disaggregated base station as discussed with respect to FIG. 2.

Method 1300 begins at step 1305 with outputting, to a second network entity, a request for an evaluation of suitability of at least one UE for data collection for at least one of ML model training or scenario evaluation. In some cases, the operations of this step refer to, or may be performed by, circuitry for outputting and/or code for outputting as described with reference to FIG. 16.

Method 1300 then proceeds to step 1310 with obtaining, in response to the request, results of the evaluation. In some cases, the operations of this step refer to, or may be performed by, circuitry for obtaining and/or code for obtaining as described with reference to FIG. 16.

In some aspects, the request is for an initial evaluation or a reevaluation of suitability of the at least one UE for data collection for at least one of ML model training or scenario evaluation.

In some aspects, the first network entity comprises a RAN node; and the second network entity comprises a CN node.

In some aspects, the method 1300 further includes detecting an event, wherein the request is output after detecting the event. In some cases, the operations of this step refer to, or may be performed by, circuitry for detecting and/or code for detecting as described with reference to FIG. 16.

In some aspects, the event involves at least one of: handover of the at least one UE from a first RAN node to a second RAN node; a change in CSI measurements reported by the at least one UE; a change in measurements of SRS transmitted from the at least one UE; a RLF or RLF recovery of the at least one UE; or a change in scheduling behavior at the first network entity.

In some aspects, the method 1300 further includes obtaining, from the second network entity, approval to trigger the evaluation. In some cases, the operations of this step refer to, or may be performed by, circuitry for obtaining and/or code for obtaining as described with reference to FIG. 16.

In some aspects, the method 1300 further includes outputting, to the at least one UE, signaling to trigger data collection. In some cases, the operations of this step refer to, or may be performed by, circuitry for outputting and/or code for outputting as described with reference to FIG. 16.

In some aspects, the method 1300 further includes obtaining data collected at the at least one UE after outputting the signaling to trigger data collection at the at least one UE. In some cases, the operations of this step refer to, or may be performed by, circuitry for obtaining and/or code for obtaining as described with reference to FIG. 16.

In some aspects, the method 1300 further includes outputting, to the second network entity, the data collected at the at least one UE, wherein the results of the evaluation are based on the data collected at the at least one UE. In some cases, the operations of this step refer to, or may be performed by, circuitry for outputting and/or code for outputting as described with reference to FIG. 16.

In some aspects, the first network entity comprises a CN node; and the second network entity comprises a RAN node.

In some aspects, the method 1300 further includes detecting an event, wherein the request for the evaluation is output after detecting the event. In some cases, the operations of this step refer to, or may be performed by, circuitry for detecting and/or code for detecting as described with reference to FIG. 16.

In some aspects, the event involves at least one of: handover of the at least one UE from a first RAN node to a second RAN node; and a threshold amount of time having passed since a previous evaluation of suitability of the at least one UE for data collection for at least one of ML model training or scenario evaluation.

In some aspects, the request indicates at least one of a duration of time after which the at least one UE is allowed to participate in data collection; or a duration of time after which suitability of the at least one UE for data collection for at least one of ML model training or scenario evaluation is to be re-evaluated.

In some aspects, the request is for periodic evaluation of suitability of the at least one UE for data collection for at least one of ML model training or scenario evaluation.

In some aspects, the results of the evaluation indicate at least one of the following states: data collected by the at least one UE can be trusted for ML model training or scenario evaluation; the at least one UE needs further evaluation before data collected by the at least one UE can be trusted for ML model training or scenario evaluation; that data collected by the at least one UE should be excluded from ML model training or scenario evaluation; or one or more reasons why data collected by the at least one UE should be excluded from ML model training or scenario evaluation.

In some aspects, the one or more reasons comprise at least one of: the at least one UE is an adversarial UE that has intentionally shared perturbed data; or data collected by the at least one UE is not suitable due to overheating, damage or malfunction at the at least one UE.

In some aspects, each of the one or more reasons has an associated trust score.

In some aspects, the method 1300 further includes outputting the results to a third network entity. In some cases, the operations of this step refer to, or may be performed by, circuitry for outputting and/or code for outputting as described with reference to FIG. 16.

In some aspects, the method 1300 further includes determining the at least one UE is a type of UE to which event triggered reevaluation of suitability for data collection for at least one of ML model training or scenario evaluation can be applied. In some cases, the operations of this step refer to, or may be performed by, circuitry for determining and/or code for determining as described with reference to FIG. 16.

In some aspects, the type of UE comprises: an untrusted UE whose collected data is excluded from at least one of ML model training or scenario evaluation; a trusted UE whose collected data is trusted for at least one of ML model training or scenario evaluation; a UE for which previous evaluation results meet certain criteria or a UE whose collected data applies to a certain scenario.

Figure 16:
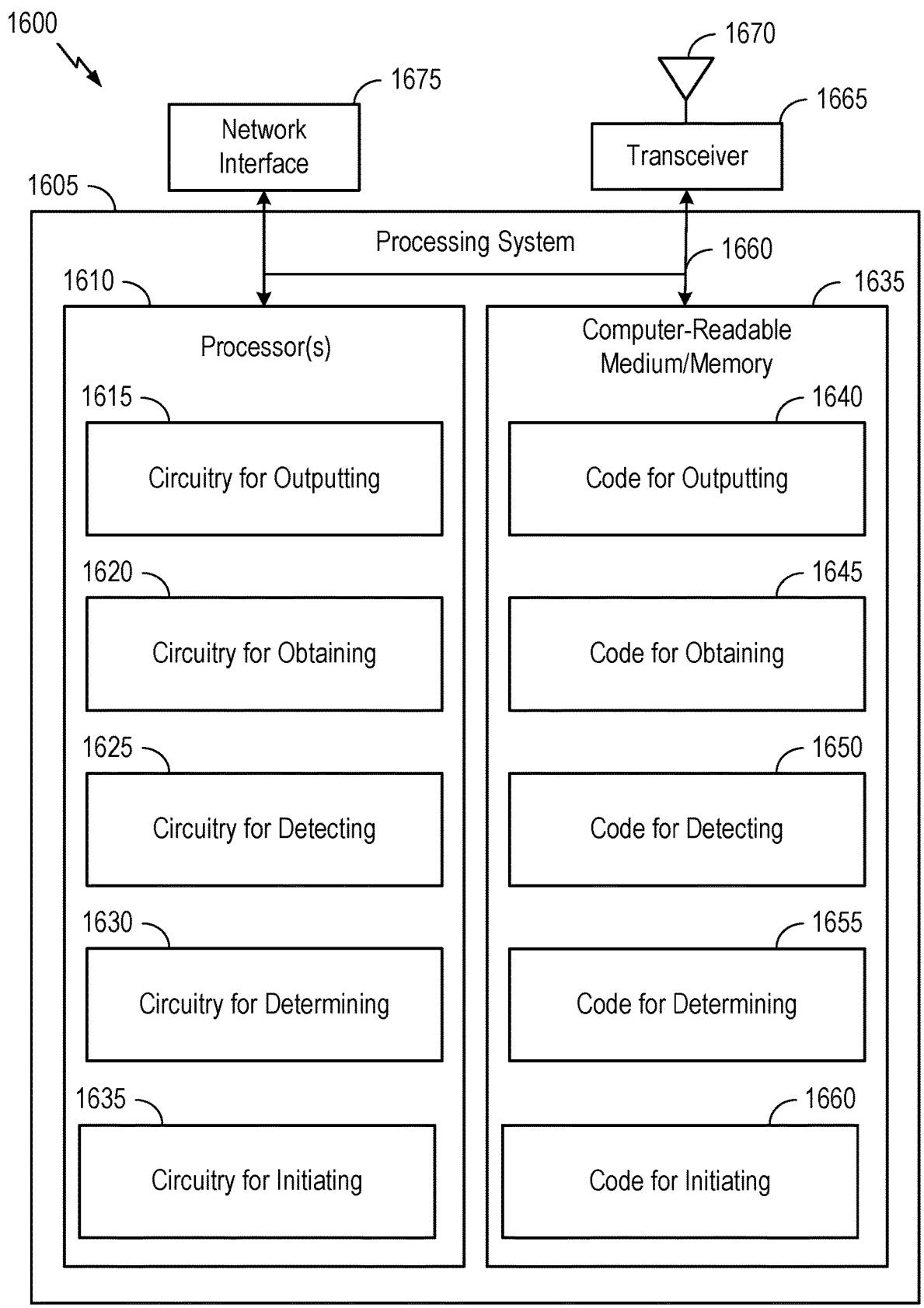
FIG. 16 depicts aspects of an example communications device.

In one aspect, method 1300, or any aspect related to it, may be performed by an apparatus, such as communications device 1600 of FIG. 16, which includes various components operable, configured, or adapted to perform the method 1300. Communications device 1600 is described below in further detail.

Note that FIG. 13 is just one example of a method, and other methods including fewer, additional, or alternative steps are possible consistent with this disclosure.

Example Operations of a Second Network Entity

Figure 14:
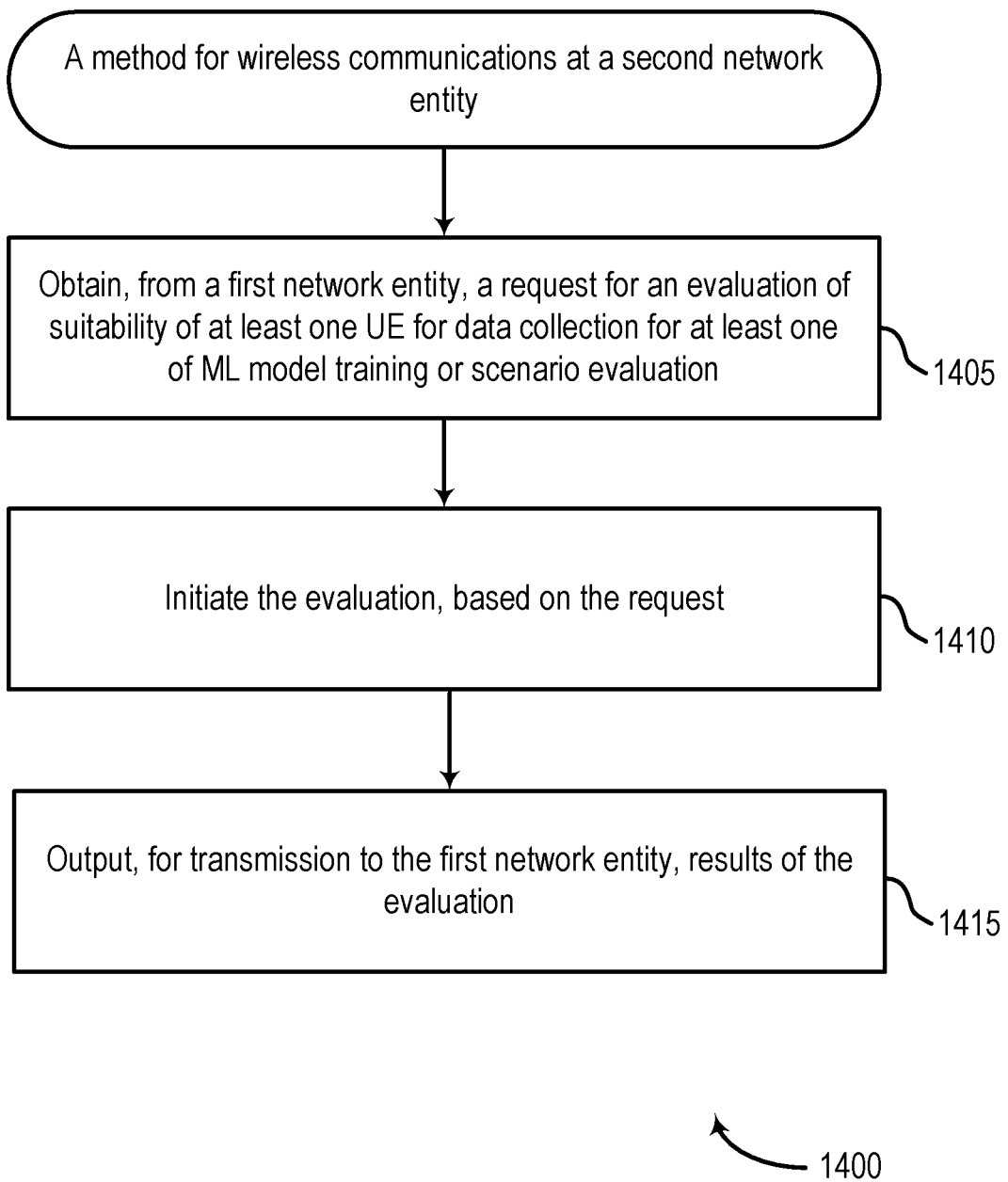
FIG. 14 depicts a method for wireless communications.

FIG. 14 shows an example of a method 1400 of wireless communication at a second network entity, such as a BS 102 of FIGS. 1 and 3, or a disaggregated base station as discussed with respect to FIG. 2.

Method 1400 begins at step 1405 with obtaining, from a first network entity, a request for an evaluation of suitability of at least one UE for data collection for at least one of ML model training or scenario evaluation. In some cases, the operations of this step refer to, or may be performed by, circuitry for obtaining and/or code for obtaining as described with reference to FIG. 16.

Method 1400 then proceeds to step 1410 with initiating, in response to the request from a first network entity, the evaluation of suitability for data collection for at least one of ML model training or scenario evaluation. In some cases, the operations of this step refer to, or may be performed by, circuitry for initiating and/or code for initiating as described with reference to FIG. 16.

Method 1400 then proceeds to step 1415 with outputting for transmission, from a second network entity to a first network entity, results of the evaluation. In some cases, the operations of this step refer to, or may be performed by, circuitry for outputting and/or code for outputting as described with reference to FIG. 16.

In one aspect, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

Example Operations of a User Equipment

Figure 15:
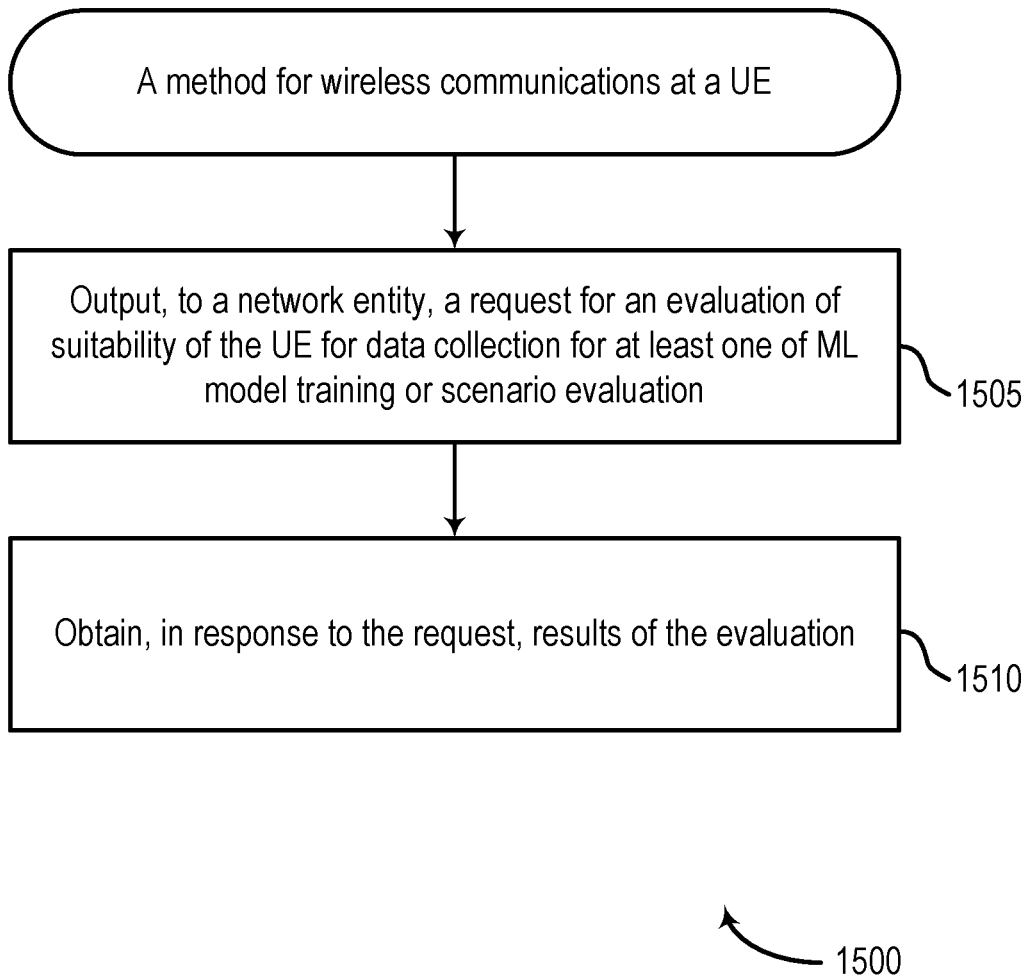
FIG. 15 depicts a method for wireless communications.

FIG. 15 shows an example of a method 1500 of wireless communication at a UE, such as a UE 104 of FIGS. 1 and 3.

Method 1500 begins at step 1505 with outputting, to a network entity, a request for an evaluation of suitability of the UE for data collection for at least one of ML model training or scenario evaluation. In some cases, the operations of this step refer to, or may be performed by, circuitry for outputting and/or code for outputting as described with reference to FIG. 16.

Method 1500 then proceeds to step 1510 with obtaining, in response to the request, results of the evaluation. In some cases, the operations of this step refer to, or may be performed by, circuitry for obtaining and/or code for obtaining as described with reference to FIG. 16.

In some aspects, the method 1500 further includes detecting an event, wherein the request is output after detecting the event. In some cases, the operations of this step refer to, or may be performed by, circuitry for detecting and/or code for detecting as described with reference to FIG. 16.

In some aspects, the event involves a change in channel conditions.

In some aspects, the request is output via at least one of RRC, MAC-CE, or UCI signaling.

In one aspect, method 1500, or any aspect related to it, may be performed by an apparatus, such as communications device 1600 of FIG. 16, which includes various components operable, configured, or adapted to perform the method 1500. Communications device 1600 is described below in further detail.

Note that FIG. 15 is just one example of a method, and other methods including fewer, additional, or alternative steps are possible consistent with this disclosure.

Example Communications Device

FIG. 16 depicts aspects of an example communications device 1600. In some aspects, communications device 1600 is a user equipment, such as UE 104 described above with respect to FIGS. 1 and 3. In some aspects, communications device 1600 is a network entity, such as BS 102 of FIGS. 1 and 3, or a disaggregated base station as discussed with respect to FIG. 2.

The communications device 1600 includes a processing system 1605 coupled to the transceiver 1665 (e.g., a transmitter and/or a receiver). In some aspects (e.g., when communications device 1600 is a network entity), processing system 1605 may be coupled to a network interface 1675 that is configured to obtain and send signals for the communications device 1600 via communication link(s), such as a backhaul link, midhaul link, and/or fronthaul link as described herein, such as with respect to FIG. 2. The transceiver 1665 is configured to transmit and receive signals for the communications device 1600 via the antenna 1670, such as the various signals as described herein. The processing system 1605 may be configured to perform processing functions for the communications device 1600, including processing signals received and/or to be transmitted by the communications device 1600.

The processing system 1605 includes one or more processors 1610. In various aspects, the one or more processors 1610 may be representative of one or more of receive processor 358, transmit processor 364, TX MIMO processor 366, and/or controller/processor 380, as described with respect to FIG. 3. In various aspects, one or more processors 1610 may be representative of one or more of receive processor 338, transmit processor 320, TX MIMO processor 330, and/or controller/processor 340, as described with respect to FIG. 3. The one or more processors 1610 are coupled to a computer-readable medium/memory 1635 via a bus 1660. In certain aspects, the computer-readable medium/memory 1635 is configured to store instructions (e.g., computer-executable code) that when executed by the one or more processors 1610, cause the one or more processors 1610 to perform the method 1300 described with respect to FIG. 13, or any aspect related to it; the method 1400 described with respect to FIG. 14, or any aspect related to it; and the method 1500 described with respect to FIG. 15, or any aspect related to it. Note that reference to a processor performing a function of communications device 1600 may include one or more processors 1610 performing that function of communications device 1600.

In the depicted example, computer-readable medium/memory 1635 stores code (e.g., executable instructions), such as code for outputting 1640, code for obtaining 1645, code for detecting 1650, code for determining 1655, and code for initiating 1660. Processing of the code for outputting 1640, code for obtaining 1645, code for detecting 1550, code for determining 1655, and code for initiating 1660 may cause the communications device 1600 to perform the method 1300 described with respect to FIG. 13, or any aspect related to it; the method 1400 described with respect to FIG. 14, or any aspect related to it; and the method 1500 described with respect to FIG. 15, or any aspect related to it The one or more processors 1610 include circuitry configured to implement (e.g., execute) the code stored in the computer-readable medium/memory 1635, including circuitry for outputting 1615, circuitry for obtaining 1620, circuitry for detecting 1625, circuitry for determining 1630 and circuitry for initiating 1635. Processing with circuitry for outputting 1615, circuitry for obtaining 1620, circuitry for detecting 1625, circuitry for determining 1630, and circuitry for initiating 1635 may cause the communications device 1600 to perform the method 1300 described with respect to FIG. 13, or any aspect related to it; the method 1400 described with respect to FIG. 14, or any aspect related to it; and the method 1500 described with respect to FIG. 15, or any aspect related to it Various components of the communications device 1600 may provide means for performing the method 1300 described with respect to FIG. 13, or any aspect related to it; the method 1400 described with respect to FIG. 14, or any aspect related to it; and the method 1500 described with respect to FIG. 15, or any aspect related to it For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1665 and the antenna 1670 of the communications device 1600 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1665 and the antenna 1670 of the communications device 1600 in FIG. 16. In some aspects, means for detecting, means for determining, and/or means for initiating may include one or more of the processors illustrated in FIG. 3.

Example Clauses

Implementation examples are described in the following numbered clauses:

Clause 1: A method for wireless communications at a first network entity, comprising: outputting, to a second network entity, a request for an evaluation of suitability of at least one UE for data collection for at least one of ML model training or scenario evaluation; and obtaining, in response to the request, results of the evaluation.

Clause 2: The method of Clause 1, wherein the request is for an initial evaluation or a reevaluation of suitability of the at least one UE for data collection for at least one of ML model training or scenario evaluation.

Clause 3: The method of any one of Clauses 1 and 2, wherein: the first network entity comprises a RAN node; and the second network entity comprises a CN node.

Clause 4: The method of Clause 3, further comprising: detecting an event, wherein the request is output after detecting the event.

Clause 5: The method of Clause 4, wherein the event involves at least one of: handover of the at least one UE from a first RAN node to a second RAN node; a change in CSI measurements reported by the at least one UE; a change in measurements of SRS transmitted from the at least one UE; a RLF or RLF recovery of the at least one UE; or a change in scheduling behavior at the first network entity.

Clause 6: The method of Clause 3, further comprising: obtaining, from the second network entity, approval to trigger the evaluation; outputting, to the at least one UE, signaling to trigger data collection; obtaining data collected at the at least one UE after outputting the signaling to trigger data collection at the at least one UE; and outputting, to the second network entity, the data collected at the at least one UE, wherein the results of the evaluation are based on the data collected at the at least one UE.

Clause 7: The method of any one of Clauses 1-6, wherein: the first network entity comprises a CN node; and the second network entity comprises a RAN node.

Clause 8: The method of Clause 7, further comprising: detecting an event, wherein the request for the evaluation is output after detecting the event.

Clause 9: The method of Clause 8, wherein the event involves at least one of: handover of the at least one UE from a first RAN node to a second RAN node; and a threshold amount of time having passed since a previous evaluation of suitability of the at least one UE for data collection for at least one of ML model training or scenario evaluation.

Clause 10: The method of Clause 7, wherein the request indicates at least one of: a duration of time after which the at least one UE is allowed to participate in data collection; or a duration of time after which suitability of the at least one UE for data collection for at least one of ML model training or scenario evaluation is to be re-evaluated.

Clause 11: The method of Clause 7, wherein the request is for periodic evaluation of suitability of the at least one UE for data collection for at least one of ML model training or scenario evaluation.

Clause 12: The method of any one of Clauses 1-11, wherein the results of the evaluation indicate at least one of the following states: data collected by the at least one UE can be trusted for ML model training or scenario evaluation; the at least one UE needs further evaluation before data collected by the at least one UE can be trusted for ML model training or scenario evaluation; that data collected by the at least one UE should be excluded from ML model training or scenario evaluation; or one or more reasons why data collected by the at least one UE should be excluded from ML model training or scenario evaluation.

Clause 13: The method of Clause 12, wherein the one or more reasons comprise at least one of: the at least one UE is an adversarial UE that has intentionally shared perturbed data; or data collected by the at least one UE is not suitable due to overheating, damage or malfunction at the at least one UE.

Clause 14: The method of Clause 12, wherein each of the one or more reasons has an associated trust score.

Clause 15: The method of Clause 12, further comprising: outputting the results to a third network entity.

Clause 16: The method of any one of Clauses 1-15, further comprising: determining the at least one UE is a type of UE to which event triggered reevaluation of suitability for data collection for at least one of ML model training or scenario evaluation can be applied.

Clause 17: The method of Clause 16, wherein the type of UE comprises: an untrusted UE whose collected data is excluded from at least one of ML model training or scenario evaluation; a trusted UE whose collected data is trusted for at least one of ML model training or scenario evaluation; a UE for which previous evaluation results meet certain criteria; or a UE whose collected data applies to a certain scenario.

Clause 18: A method for wireless communications at a second network entity, comprising: obtaining, from a first network entity, a request for an evaluation of suitability of at least one user equipment (UE) for data collection associated with at least one of: a machine learning (ML) model training; or a scenario evaluation; initiating the evaluation, based on the request; and outputting, for transmission to the first network entity, results of the evaluation Clause 19: The method of Clause 18, wherein the evaluation comprises an initial evaluation or a reevaluation of suitability of the at least one UE for data collection associated with at least one of the ML model training or the scenario evaluation.

Clause 20: The method of any one of Clauses 18-19, wherein: the first network entity comprises a radio access network (RAN) node; and the second network entity comprises a core network (CN) node.

Clause 21: The method of Clause 20, further comprising: obtaining, from the second network entity, an approval to trigger the evaluation; outputting, to the at least one UE, signaling to trigger the data collection; obtaining data collected at the at least one UE after outputting the signaling to trigger the data collection at the at least one UE; and outputting, to the second network entity, the data collected at the at least one UE, wherein the results of the evaluation are based on the data collected at the at least one UE.

Clause 22: The method of any one of Clauses 18-21, wherein: the first network entity comprises a core network (CN) node; and the second network entity comprises a radio access network (RAN) node.

Clause 23: The method of any one of Clauses 18-22, wherein the results of the evaluation indicate at least one of the following states: data collected by the at least one UE can be trusted for the ML model training or the scenario evaluation; the at least one UE needs further evaluation before data collected by the at least one UE can be trusted for the ML model training or the scenario evaluation; data collected by the at least one UE should be excluded from the ML model training or the scenario evaluation; or one or more reasons why data collected by the at least one UE should be excluded from the ML model training or the scenario evaluation.

Clause 24: The method of Clause 23, wherein the one or more reasons comprise at least one of: the at least one UE is an adversarial UE that has intentionally shared perturbed data; or data collected by the at least one UE is not suitable due to overheating, damage or malfunction at the at least one UE.

Clause 25: The method of any one of Clauses 23-24, wherein each of the one or more reasons has an associated trust score.

Clause 26: A method for wireless communications at a UE, comprising: outputting, to a network entity, a request for an evaluation of suitability of the UE for data collection for at least one of ML model training or scenario evaluation; and obtaining, in response to the request, results of the evaluation.

Clause 27: The method of Clause 26, further comprising: detecting an event, wherein the request is output after detecting the event.

Clause 28: The method of Clause 27, wherein the event involves a change in channel conditions.

Clause 29: The method of any one of Clauses 26-28, wherein the request is output via at least one of RRC, MAC-CE, or UCI signaling.

Clause 30: An apparatus, comprising: a memory comprising executable instructions; and a processor configured to execute the executable instructions and cause the apparatus to perform a method in accordance with any one of Clauses 1-29.

Clause 31: An apparatus, comprising means for performing a method in accordance with any one of Clauses 1-29.

Clause 32: A non-transitory computer-readable medium comprising executable instructions that, when executed by a processor of an apparatus, cause the apparatus to perform a method in accordance with any one of Clauses 1-29.

Clause 33: A computer program product embodied on a computer-readable storage medium comprising code for performing a method in accordance with any one of Clauses 1-29.

Clause 34: A network entity, comprising: at least one transceiver; a memory comprising instructions; and one or more processors configured to execute the instructions and cause the network entity to perform a method in accordance with any one of Clauses 1-17, wherein the at least one transceiver is configured to transmit the request.

Clause 35: A network entity, comprising: at least one transceiver; a memory comprising instructions; and one or more processors configured to execute the instructions and cause the network entity to perform a method in accordance with any one of Clauses 18-25, wherein the at least one transceiver is configured to receive the request.

Clause 36: A user equipment (UE), comprising: at least one transceiver; a memory comprising instructions; and one or more processors configured to execute the instructions and cause the UE to perform a method in accordance with any one of Clauses 26-29, wherein the at least one transceiver is configured to transmit the request.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising: at least one memory comprising processor-executable instructions; and one or more processors configured to execute the processor-executable instructions to cause the apparatus to:
   output, for transmission from a first network entity to a second network entity, a request for an evaluation of suitability of at least one user equipment (UE) for data collection associated with at least one of:
   a machine learning (ML) model training; or
   a scenario evaluation; and
   obtain, in response to the request, results of the evaluation.

2. The apparatus of claim 1, wherein the evaluation comprises an initial evaluation or a reevaluation of suitability of the at least one UE for data collection associated with at least one of the ML model training or the scenario evaluation.

3. The apparatus of claim 1, wherein:
   the first network entity comprises a radio access network (RAN) node; and
   the second network entity comprises a core network (CN) node.

4. The apparatus of claim 3, wherein the one or more processors are further configured to execute the processor-executable instructions to cause the apparatus to:
   obtain, from the second network entity, an approval to trigger the evaluation;
   output, to the at least one UE, signaling to trigger the data collection;
   obtain data collected at the at least one UE after outputting the signaling to trigger the data collection at the at least one UE; and
   output, to the second network entity, the data collected at the at least one UE, wherein the results of the evaluation are based on the data collected at the at least one UE.

5. The apparatus of claim 1, wherein the one or more processors are further configured to execute the processor-executable instructions to cause the apparatus to detect an event, wherein the request is output after detecting the event.

6. The apparatus of claim 5, wherein the event involves at least one of:
   a handover of the at least one UE from a first RAN node to a second RAN node;
   a change in channel state information (CSI) measurements reported by the at least one UE;
   a change in measurements of sounding reference signals (SRS) obtained from the at least one UE;
   a radio link failure (RLF) or a RLF recovery of the at least one UE; or
   a change in scheduling behavior at the first network entity.

7. The apparatus of claim 1, wherein:
   the first network entity comprises a core network (CN) node; and
   the second network entity comprises a radio access network (RAN) node.

8. The apparatus of claim 7, wherein the one or more processors are further configured to execute the processor-executable instructions to cause the apparatus to detect an event, wherein the request for the evaluation is output after detecting the event.

9. The apparatus of claim 8, wherein the event involves at least one of:
   a handover of the at least one UE from a first RAN node to a second RAN node; or
   a threshold amount of time having passed since a previous evaluation of suitability of the at least one UE for data collection associated with the at least one of ML model training or the scenario evaluation.

10. The apparatus of claim 7, wherein the request indicates at least one of:
    a duration of time after which the at least one UE is allowed to participate in data collection; or
    a duration of time after which suitability of the at least one UE for data collection associated with at least one of the ML model training or the scenario evaluation is to be re-evaluated.

11. The apparatus of claim 7, wherein the evaluation comprises at least one periodic evaluation of suitability of the at least one UE for data collection associated with at least one of ML model training or scenario evaluation.

12. The apparatus of claim 1, wherein the results of the evaluation indicate at least one of the following states:
    data collected by the at least one UE can be trusted for the ML model training or the scenario evaluation;
    the at least one UE needs further evaluation before data collected by the at least one UE can be trusted for the ML model training or the scenario evaluation;
    data collected by the at least one UE should be excluded from the ML model training or the scenario evaluation; or
    one or more reasons why data collected by the at least one UE should be excluded from the ML model training or the scenario evaluation.

13. The apparatus of claim 12, wherein the one or more reasons comprise at least one of:
    the at least one UE is an adversarial UE that has intentionally shared perturbed data; or
    data collected by the at least one UE is not suitable due to overheating, damage or malfunction at the at least one UE.

14. The apparatus of claim 12, wherein each of the one or more reasons has an associated trust score.

15. The apparatus of claim 1, wherein the one or more processors are further configured to execute the processor-executable instructions to cause the apparatus to output the results to a third network entity.

16. The apparatus of claim 1, wherein the UE comprises:
    an untrusted UE whose collected data is excluded from at least one of the ML model training or the scenario evaluation;
    a trusted UE whose collected data is trusted for at least one of the ML model training or the scenario evaluation;

a UE for which previous evaluation results meet certain criteria; or a UE whose collected data applies to a certain scenario.

17. The apparatus of claim 1, further comprising at least one transceiver, wherein:

the at least one transceiver is configured to transmit the request; and the apparatus is configured as the first network entity.

18. An apparatus for wireless communication, comprising: at least one memory comprising processor-executable instructions; and one or more processors configured to execute the processor-executable instructions to cause the apparatus to:

obtaining, from a first network entity, a request for an evaluation of suitability of at least one user equipment (UE) for data collection associated with at least one of:
a machine learning (ML) model training; or
a scenario evaluation;

initiating the evaluation, based on the request; and outputting, for transmission from a second network entity to the first network entity, results of the evaluation.

19. The apparatus of claim 18, wherein the evaluation comprises an initial evaluation or a reevaluation of suitability of the at least one UE for data collection associated with at least one of the ML model training or the scenario evaluation.

20. The apparatus of claim 18, wherein:

the first network entity comprises a radio access network (RAN) node; and the second network entity comprises a core network (CN) node.

21. The apparatus of claim 20, wherein the one or more processors are further configured to execute the processor-executable instructions to cause the apparatus to:

obtain, from the first network entity, an approval to trigger the evaluation;

output, to the at least one UE, signaling to trigger the data collection;

obtain data collected at the at least one UE after outputting the signaling to trigger the data collection at the at least one UE; and output, to the first network entity, the data collected at the at least one UE, wherein the results of the evaluation are based on the data collected at the at least one UE.

22. The apparatus of claim 18, wherein:

the first network entity comprises a core network (CN) node; and the second network entity comprises a radio access network (RAN) node.

23. The apparatus of claim 18, wherein the results of the evaluation indicate at least one of the following states:

data collected by the at least one UE can be trusted for the ML model training or the scenario evaluation;

the at least one UE needs further evaluation before data collected by the at least one UE can be trusted for the ML model training or the scenario evaluation;

data collected by the at least one UE should be excluded from the ML model training or the scenario evaluation; or one or more reasons why data collected by the at least one UE should be excluded from the ML model training or the scenario evaluation.

24. The apparatus of claim 23, wherein the one or more reasons comprise at least one of the at least one UE is an adversarial UE that has intentionally shared perturbed data or data collected by the at least one UE is not suitable due to overheating, damage or malfunction at the at least one UE.

25. The apparatus of claim 18, further comprising at least one transceiver, wherein:

the at least one transceiver is configured to receive the request; and the apparatus is configured as the second network entity.

26. An apparatus for wireless communications, comprising: at least one memory comprising processor-executable instructions; and one or more processors configured to execute the processor-executable instructions to cause the apparatus to:

output, to a network entity, a request for an evaluation of suitability of the apparatus for data collection associated with at least one of machine learning (ML) model training or scenario evaluation; and obtain, in response to the request, results of the evaluation.

27. The apparatus of claim 26, wherein the one or more processors are further configured to execute the processor-executable instructions to cause the apparatus to detect an event, wherein the request is output after detecting the event.

28. The apparatus of claim 27, wherein the event involves a change in channel conditions.

29. The apparatus of claim 26, wherein the request is output via at least one of radio resource control (RRC), medium access control (MAC) control element (CE), or uplink control information (UCI) signaling.

30. The apparatus of claim 26, further comprising at least one transceiver, wherein:

the at least one transceiver is configured to transmit the request; and the apparatus is configured as a user equipment (UE).

* * * * *